US010715483B2

(12) United States Patent
Forsyth et al.

(10) Patent No.: US 10,715,483 B2
(45) Date of Patent: *Jul. 14, 2020

(54) METHOD AND APPARATUS FOR PROVISIONING A SCALABLE COMMUNICATIONS NETWORK

(71) Applicant: AT&T Intellectual Property I, L.P., Atlanta, GA (US)

(72) Inventors: James W. Forsyth, Royal Oak, MI (US); Bernard Ku, Austin, TX (US); Lakshminarashimhan Naidu, Pearland, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 8 days.

This patent is subject to a terminal disclaimer.

(21) Appl. No.: 16/238,330

(22) Filed: Jan. 2, 2019

(65) Prior Publication Data

US 2019/0141008 A1    May 9, 2019

Related U.S. Application Data

(63) Continuation of application No. 15/399,780, filed on Jan. 6, 2017, now Pat. No. 10,263,948, which is a (Continued)

(51) Int. Cl.
*G06F 17/00* (2019.01)
*H04L 29/12* (2006.01)
(Continued)

(52) U.S. Cl.
CPC ........ *H04L 61/1552* (2013.01); *H04L 61/106* (2013.01); *H04L 61/157* (2013.01);
(Continued)

(58) Field of Classification Search
None
See application file for complete search history.

(56) References Cited

U.S. PATENT DOCUMENTS 7,274,683 B2   9/2007   Segal
7,277,421 B1   10/2007  Pershan
(Continued)

OTHER PUBLICATIONS

Microsoft, "How DNS query works", http://technet.microsoft.com/en-us/library/cc775637(d=printer,v=ws.10).aspx, Jan. 21, 2005.

*Primary Examiner* — Sithu Ko
(74) *Attorney, Agent, or Firm* — Guntin & Gust, PLC; Matthew Tropper

(57) ABSTRACT

A method that incorporates teachings of the subject disclosure may include, for example, determining at a first directory server of a first regional call processing system whether a new name authority pointer associated with a telephone number is within a first geographic region of the first regional call processing system, transmitting the new name authority pointer to a first name server of the first regional call processing system for provisioning the name authority pointer to the first name server responsive to determining that the telephone number is located within the first geographic region, and transmitting the new name authority pointer to a second directory server for provisioning the new name authority pointer to a second name server of a second regional call processing system responsive to determining that the telephone number is not located within the first geographic region. Other embodiments are disclosed.

20 Claims, 32 Drawing Sheets

Related U.S. Application Data continuation of application No. 14/606,644, filed on Jan. 27, 2015, now Pat. No. 9,577,978, which is a continuation of application No. 13/689,087, filed on Nov. 29, 2012, now Pat. No. 8,976,784.

(51) Int. Cl.
  *H04M 7/00* (2006.01)
  *H04M 3/22* (2006.01)
  *H04M 3/42* (2006.01)

(52) U.S. Cl.
  CPC ........ *H04L 61/1523* (2013.01); *H04L 61/605* (2013.01); *H04M 3/229* (2013.01); *H04M 3/42348* (2013.01); *H04M 7/0075* (2013.01)

(56) References Cited

U.S. PATENT DOCUMENTS

| | | | |
|---|---|---|---|
| 7,320,026 B2* | 1/2008 | Adamczyk | H04L 29/12009 379/88.17 |
| 7,529,231 B2 | 5/2009 | Soo | |
| 7,778,231 B2 | 8/2010 | Ku | |
| 7,796,578 B2 | 9/2010 | Stafford | |
| 7,920,549 B2* | 4/2011 | Alt | H04L 63/0281 370/352 |
| 8,184,798 B2 | 5/2012 | Wiatrowski | |
| 8,571,015 B2 | 10/2013 | Ku | |
| 2004/0003114 A1 | 1/2004 | Adamczyk | |
| 2005/0182781 A1* | 8/2005 | Bouvet | H04L 29/12066 |
| 2006/0067305 A1 | 3/2006 | Kobayashi et al. | |
| 2006/0077959 A1 | 4/2006 | Beckemeyer | |
| 2006/0092922 A1 | 5/2006 | Kobayashi et al. | |
| 2006/0165060 A1* | 7/2006 | Dua | G06Q 20/3821 370/352 |
| 2007/0019622 A1 | 1/2007 | Alt et al. | |
| 2007/0127492 A1 | 6/2007 | Wellington et al. | |
| 2008/0019356 A1 | 1/2008 | Marsico | |
| 2008/0025316 A1 | 1/2008 | Zampiello et al. | |
| 2008/0049918 A1 | 2/2008 | Heinze et al. | |
| 2008/0098084 A1* | 4/2008 | Volz | H04L 29/12066 709/217 |
| 2009/0106291 A1* | 4/2009 | Ku | H04L 61/1511 |
| 2009/0147770 A1 | 6/2009 | Ku | |
| 2009/0316701 A1 | 12/2009 | Yoo et al. | |
| 2010/0150145 A1 | 6/2010 | Ku | |
| 2010/0153563 A1 | 6/2010 | Ku | |
| 2010/0157977 A1 | 6/2010 | Ku | |
| 2010/0158229 A1 | 6/2010 | Ku | |
| 2010/0272101 A1 | 10/2010 | Ku et al. | |
| 2011/0182287 A1* | 7/2011 | Ku | H04L 27/2613 370/352 |
| 2011/0211684 A1 | 9/2011 | Wu et al. | |
| 2011/0271005 A1 | 11/2011 | Bharrat et al. | |
| 2013/0305291 A1 | 11/2013 | Dua | |
| 2017/0187675 A1 | 6/2017 | Forsyth et al. | |

\* cited by examiner

100

CLEVELAND 160 / 260

| BLADE 1 | BLADE 2 | BLADE 3 | BLADE 4 | BLADE 5 | BLADE 6 | BLADE 7 | BLADE 8 |
|---|---|---|---|---|---|---|---|
| CP NS | CP NS | CP NS | CP NS | Reserved | Reserved | Reserved | Reserved |
| SLAVE NC-REGION CP POOL | SLAVE NC-REGION CP POOL | SLAVE SC-REGION CP POOL | SLAVE SC-REGION CP POOL | CP NS SLAVE NE-REGION CP POOL | CP NS SLAVE NE-REGION CP POOL | CP NS SLAVE SE-REGION CP POOL | CP NS SLAVE SE-REGION CP POOL |
| 102.102 | 102.102 | 102.103 | 102.103 | 102.104 | 102.104 | 102.105 | 102.105 |
| 2322::6 | 2322::6 | 2322::7 | 2322::7 | 2322::8 | 2322::8 | 2322::9 | 2322::9 |
| 111.172 | 111.172 | | | | | | |
| 2212::1? | 2212::1? | | | | | | |

| BLADE 9 | BLADE 10 | BLADE 11 | BLADE 12 | BLADE 13 | BLADE 14 | BLADE 15 | BLADE 16 |
|---|---|---|---|---|---|---|---|
| Reserved | Reserved | CP NS | CP NS | OAMP | OAMP | Directory Server | Directory Server |
| CP NS SLAVE W-REGION CP POOL | CP NS SLAVE W-REGION CP POOL | SLAVE NC-REGION CP POOL | SLAVE NC-REGION CP POOL | CP NS MASTER/SLAVE NC-REGION CP POOL | CP NS MASTER/SLAVE NC-REGION CP POOL | ENUM2 NC-REGION LDAP Pool | ENUM2 NC-REGION LDAP Pool |
| 102.106 | 102.106 | 102.102 | 102.102 | 102.102 | 102.102 | 185.94 | 185.94 |
| 2322::a | 2322::a | 2322::6 | 2322::6 | 2322::6 | 2322::6 | | |
| | | 111.172 | 111.172 | 111.172 | 111.172 | | |
| | | 2212::1? | 2212::1? | 2212::1? | 2212::1? | | |

SOUTHCENTRAL REGION
SAN ANTONIO

170
330

| BLADE 1 | BLADE 2 | BLADE 3 | BLADE 4 | BLADE 5 | BLADE 6 | BLADE 7 | BLADE 8 |
|---|---|---|---|---|---|---|---|
| CP NS | CP NS | CP NS | CP NS | Reserved | Reserved | Reserved | Reserved |
| SLAVE NC-REGION CP POOL | SLAVE NC REGION CP POOL | SLAVE SC-REGION CP POOL | SLAVE SC-REGION CP POOL | CP NS SLAVE NE-REGION CP POOL | CP NS SLAVE NE-REGION CP POOL | CP NS SLAVE SE-REGION CP POOL | CP NS SLAVE SE-REGION CP POOL |
| 103.102 | 103.102 | 103.103 | 103.103 | 103.104 | 103.104 | 103.105 | 103.105 |
| 2422::6 | 2422::6 | 2422::7 | 2422::7 | 2422::8 | 2422::8 | 2422::9 | 2422::9 |
| 111.18? | 111.18? | | | | | | |
| 2312::2? | 2312::1? | | | | | | |

| BLADE 9 | BLADE 10 | BLADE 11 | BLADE 12 | BLADE 13 | BLADE 14 | BLADE 15 | BLADE 16 |
|---|---|---|---|---|---|---|---|
| Reserved | Reserved | CP NS | CP NS | OAMP | OAMP | Directory | Directory |
| CP NS | CP NS | SLAVE | MASTER SC-REGION CP POOL | CP NS MASTER/ SLAVE | CP NS MASTER/ SLAVE | Server ENUM2 | Server ENUM2 |
| SLAVE W-REGION CP POOL | SLAVE W-REGION CP POOL | SC-REGION CP POOL | | SC-REGION CP POOL | SC-REGION CP POOL | SC-REGION LDAP Pool | SC-REGION LDAP Pool |
| 103.106 | 103.106 | 103.103 | 103.103 | 103.103 | 103.103 | 186.94 | 186.94 |
| 2422::a | 2422::a | 2422::7 | 2422::7 | 2422::7 | 2422::7 | | |
| | | 111.18? | 111.18? | 111.18? | 111.18? | | |
| | | 2312::1? | 2312::1? | 2312::1? | 2312::1? | | |

170 / 335 — KANSAS CITY

| BLADE 1 | BLADE 2 | BLADE 3 | BLADE 4 | BLADE 5 | BLADE 6 | BLADE 7 | BLADE 8 |
|---|---|---|---|---|---|---|---|
| CP NS SLAVE NC-REGION CP POOL 104.102 2522::6 111.182 2312::12 | CP NS SLAVE NC REGION CP POOL 104.102 2522::6 111.182 2312::12 | CP NS SLAVE SC-REGION CP POOL 104.103 2522::7 | CP NS SLAVE SC-REGION CP POOL 104.103 2522::7 | Reserved CP NS SLAVE NE-REGION CP POOL 104.104 2522::8 | Reserved CP NS SLAVE NE-REGION CP POOL 104.104 2522::8 | Reserved CP NS SLAVE SE-REGION CP POOL 104.105 2522::9 | Reserved CP NS SLAVE SE-REGION CP POOL 104.105 2522::9 |

| BLADE 9 | BLADE 10 | BLADE 11 | BLADE 12 | BLADE 13 | BLADE 14 | BLADE 15 | BLADE 16 |
|---|---|---|---|---|---|---|---|
| Reserved CP NS SLAVE W-REGION CP POOL 104.106 2522::a | Reserved CP NS SLAVE W-REGION CP POOL 104.106 2522::a | CP NS SLAVE SC-REGION CP POOL 104.103 2522::7 111.182 2312::12 | CP NS SLAVE SC-REGION CP POOL 104.103 2522::7 111.182 2312::12 | OAMP CP NS MASTER/ SLAVE SC-REGION CP POOL 104.103 2522::6 111.182 2312::12 | OAMP CP NS MASTER/ SLAVE SC-REGION CP POOL 104.103 2522::7 111.182 2312::12 | Directory Server ENUM2 SC-REGION LDAP Pool 187.94 | Directory Server ENUM2 SC-REGION LDAP Pool 187.94 |

330

| BLADE 1 | BLADE 2 | BLADE 3 | BLADE 4 | BLADE 11 |
|---|---|---|---|---|
| CP NS | CP NS | CP NS | CP NS | CP NS |
| SLAVE NC- | SLAVE NC- | SLAVE SC- | SLAVE SC- | SLAVE |
| REGION CP | REGION CP | REGION CP | REGION CP | SC-REGION |
| POOL | POOL | POOL | POOL | CP POOL |
| 103.102 | 103.102 | 103.103 | 103.103 | 103.103 |
| 2422:::6 | 2422:::6 | 2422:::7 | 2422:::7 | 2422:::7 |
| 111.18? | 111.18? | | | 111.18? |
| 2312::2? | 2312::1? | | | 2312::1? |

| BLADE 13 | BLADE 14 |
|---|---|
| OAMP | OAMP |
| CP NS | CP NS |
| MASTER/ | MASTER/ |
| SLAVE | SLAVE |
| SC-REGION | SC-REGION |
| CP POOL | CP POOL |
| 103.103 | 103.103 |
| 2422::7 | 2422::7 |
| 111.18? | 111.18? |
| 2312::1? | 2312::1? |

| BLADE 15 |
|---|
| Directory |
| Server |
| ENUM2 |
| SC-REGION |
| LDAP Pool |
| 186.94 |

| Load Balancer Pair |
|---|

| BLADE 12 |
|---|
| CP NS |
| MASTER |
| SC-REGION |
| CP POOL |
| 103.103 |
| 2422::7 |
| 111.18? |
| 2312::1? |

| BLADE 16 |
|---|
| Directory |
| Server |
| ENUM2 |
| SC-REGION |
| LDAP Pool |
| 186.94 |

SAN ANTONIO

| BLADE 1 | BLADE 2 | BLADE 3 | BLADE 4 | BLADE 11 | BLADE 12 |
|---|---|---|---|---|---|
| CP NS SLAVE NC-REGION CP POOL 104.102 2522::6 111.18? 2312::1? | CP NS SLAVE NC-REGION CP POOL 104.102 2522::6 111.18? 2312::1? | CP NS SLAVE SC-REGION CP POOL 104.103 2522::7 | CP NS SLAVE SC-REGION CP POOL 104.103 2522::7 | CP NS SLAVE SC-REGION CP POOL 104.103 2522::6 111.18? 2312::1? | CP NS SLAVE SC-REGION CP POOL 104.103 2522::7 111.18? 2312::1? |

BLADE 13
OAMP
CP NS
MASTER/SLAVE
SC-REGION
CP POOL
104.103
2522::6
111.18?
2312::1?

BLADE 14
OAMP
CP NS
MASTER/SLAVE
SC-REGION
CP POOL
104.103
2522::7
111.18?
2312::1?

BLADE 15
Directory Server
ENUM2
SC-REGION
LDAP Pool
187.94

BLADE 16
Directory Server
ENUM2
SC-REGION
LDAP Pool
187.94

Load Balancer Pair

KANSAS CITY

| BLADE 1 | BLADE 2 | BLADE 3 | BLADE 4 | BLADE 11 | BLADE 12 |
|---|---|---|---|---|---|
| CP NS | CP NS | CP NS | CP NS | CP NS | CP NS |
| SLAVE NC- | SLAVE NC- | SLAVE SC- | SLAVE SC- | SLAVE SC- | SLAVE SC- |
| REGION CP | REGION CP | REGION CP | REGION CP | REGION CP | REGION CP |
| POOL | POOL | POOL | POOL | POOL | POOL |
| 104.102 | 104.102 | 104.103 | 104.103 | 104.103 | 104.103 |
| 2522::6 | 2522::6 | 2522::7 | 2522::7 | 2522::6 | 2522::7 |
| 111.18? | 111.18? |  |  | 111.18? | 111.18? |
| 2312::1? | 2312::1? |  |  | 2312::1? | 2312::1? |

BLADE 13
OAMP
CP NS
MASTER/
SLAVE
SC-REGION
CP POOL
104.103
2522::6
111.18?
2312::1?

BLADE 14
OAMP
CP NS
MASTER/
SLAVE
SC-REGION
CP POOL
104.103
2522::7
111.18?
2312::1?

BLADE 15
Directory
Server
ENUM2
SC-REGION
LDAP Pool
187.94

BLADE 16
Directory
Server
ENUM2
SC-REGION
LDAP Pool
187.94

Load Balancer Pair

KANSAS CITY

| BLADE 1 | BLADE 2 | BLADE 3 | BLADE 4 | BLADE 11 | BLADE 12 |
|---|---|---|---|---|---|
| CP NS | CP NS | CP NS | CP NS | CP NS | CP NS |
| SLAVE NC- | SLAVE NC- | SLAVE SC- | SLAVE SC- | SLAVE SC- | SLAVE SC- |
| REGION CP | REGION CP | REGION CP | REGION CP | REGION CP | REGION CP |
| POOL | POOL | POOL | POOL | POOL | POOL |
| 104.102 | 104.102 | 104.103 | 104.103 | 104.103 | 104.103 |
| 2522::6 | 2522::6 | 2522::7 | 2522::7 | 2522::6 | 2522::7 |
| 111.18? | 111.18? | | | 111.18? | 111.18? |
| 2312::1? | 2312::1? | | | 2312::1? | 2312::1? |

BLADE 13
OAMP
CP NS
MASTER/
SLAVE
SC-REGION
CP POOL
104.103
2522::6
111.18?
2312::1?

BLADE 14
OAMP
CP NS
MASTER/
SLAVE
SC-REGION
CP POOL
104.103
2522::7
111.18?
2312::1?

BLADE 15
Directory
Server
ENUM2
SC-REGION
LDAP Pool
187.94

BLADE 16
Directory
Server
ENUM2
SC-REGION
LDAP Pool
187.94

Load Balancer Pair

KANSAS CITY

| BLADE 1 | BLADE 2 | BLADE 3 | BLADE 4 | BLADE 11 | BLADE 12 |
|---|---|---|---|---|---|
| CP NS | CP NS | CP NS | CP NS | CP NS | CP NS |
| SLAVE NC- | SLAVE NC- | SLAVE SC- | SLAVE SC- | SLAVE SC- | SLAVE SC- |
| REGION CP | REGION CP | REGION CP | REGION CP | REGION CP | REGION CP |
| POOL | POOL | POOL | POOL | POOL | POOL |
| 104.102 | 104.102 | 104.103 | 104.103 | 104.103 | 104.103 |
| 2522::6 | 2522::6 | 2522::7 | 2522::7 | 2522::6 | 2522::7 |
| 111.18? | 111.18? | | | 111.18? | 111.18? |
| 2312::1? | 2312::1? | | | 2312::1? | 2312::1? |

BLADE 13
OAMP
CP NS
MASTER/
SLAVE
SC-REGION
CP POOL
104.103
2522::6
111.18?
2312::1?

BLADE 14
OAMP
CP NS
MASTER/
SLAVE
SC-REGION
CP POOL
104.103
2522::7
111.18?
2312::1?

BLADE 15
Directory
Server
ENUM2
SC-REGION
LDAP Pool
187.94

BLADE 16
Directory
Server
ENUM2
SC-REGION
LDAP Pool
187.94

Load Balancer Pair

KANSAS CITY

METHOD AND APPARATUS FOR PROVISIONING A SCALABLE COMMUNICATIONS NETWORK

CROSS-REFERENCE TO RELATED APPLICATIONS

This application is a continuation of U.S. patent application Ser. No. 15/399,780, filed Jan. 6, 2017, which is a continuation of U.S. patent application Ser. No. 14/606,644, filed Jan. 27, 2015 (now U.S. Pat. No. 9,577,978), which is a continuation of U.S. patent application Ser. No. 13/689,087, filed Nov. 29, 2012 (now U.S. Pat. No. 8,976,784). All sections of the aforementioned application(s) and patent(s) are incorporated herein by reference in their entirety.

FIELD OF THE DISCLOSURE

The subject relates generally to telecommunications and more specifically to an apparatus and methods for provisioning a scalable communications network.

BACKGROUND

As communications technology improves and demand for communication services grows, providers often seek to adjust systems to incorporate the improved technology and expand those systems to accommodate the growing demand Systems that are slow to adjust or expand can be undesirable and are often rendered obsolete. Systems that expand by providing unnecessary redundancy are inefficient and costly. Advances in telecommunication technologies create opportunities for integrating communication capabilities as well as challenges for transitioning between technological generations.

BRIEF DESCRIPTION OF THE DRAWINGS

Reference will now be made to the accompanying drawings, which are not necessarily drawn to scale, and wherein:

FIGS. 1, 2, 3A-3D, 4A-4D, 5A-5D, 6A-6D and 7A-7D depict illustrative embodiments of a hierarchical telephone number mapping system for or a scalable and decentralized telephone number mapping;

DETAILED DESCRIPTION

Figure 1:
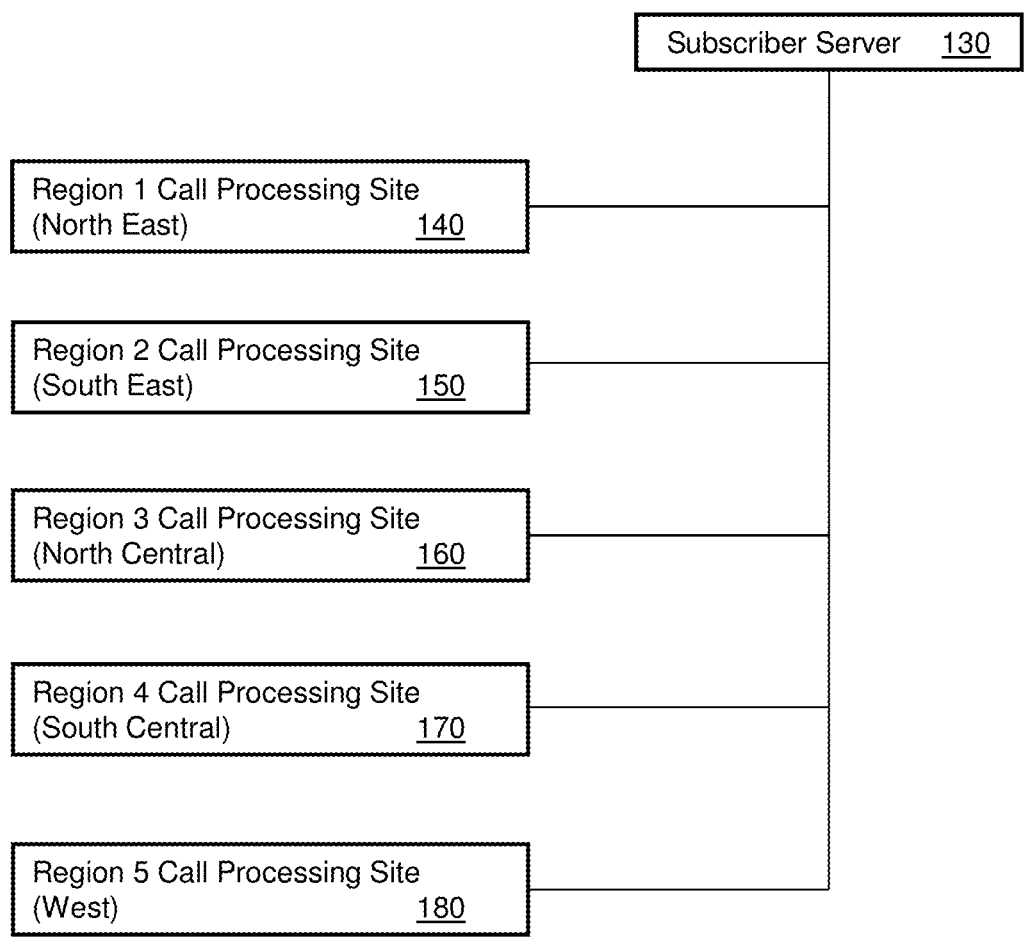

The subject disclosure describes, among other things, illustrative embodiments for scaling a tElephone NUmber Mapping (ENUM) service in a communications network. Other embodiments are described in the subject disclosure.

One embodiment of the subject disclosure includes a method including receiving, by a first directory server of a first regional call processing system, a new name authority pointer associated with a telephone number and comprising an internet protocol address for establishing communications with a communication device associated with the telephone number. The method also includes determining, by the first directory server, whether the new name authority pointer is within a first geographic region of the first regional call processing system based on a numbering plan area code of the telephone number. The method further includes storing, by the first directory server, the new name authority pointer at a first directory responsive to determining that the telephone number is located within the first geographic region. The method includes transmitting, by the first directory server, the new name authority pointer to a second directory server of a second regional call processing system responsive to determining that the telephone number is not located within the first geographic region, wherein the second directory server is accessible by a second name server of the second regional call processing system for provisioning the new name authority pointer to the second name server. The method includes receiving, by the directory server, a first query for the new name authority point from a first name server of the first regional processing system and, in turn, transmitting, by the directory server, the new name authority pointer to the first name server for provisioning the name authority pointer to the first name server responsive to the first query One embodiment of the subject disclosure includes a device comprising a memory to store computer instructions and a processor coupled to the memory. The processor can perform operations responsive to executing the computer instructions including transmitting a first query to a first directory server of a first regional call processing system for a new name authority pointer associated with a telephone number and comprising an internet protocol address for establishing communications with a communication device associated with the telephone number. The processor can also perform operations for receiving the new name authority pointer from the first directory server responsive to the first query. The processor can further perform operations for storing the new name authority pointer received from the first directory server at the first name server. The processor can perform operations for receiving a first request for the new name authority pointer from a second name server of the first regional call processing system. The processor can further perform operations for transmitting the new name authority pointer to the second name server responsive to the first request.

One embodiment of the subject disclosure includes a computer-readable storage medium including computer instructions, which, responsive to being executed by a processor, can cause the processor to perform operations for determining at a first directory server of a first regional call processing system whether a new name authority pointer associated with a telephone number is within a first geographic region of the first regional call processing system. The computer instructions can cause the processor to perform operations for transmitting the new name authority pointer to a first name server of the first regional processing system for provisioning the name authority pointer to the first name server responsive to determining that the telephone number is located within the first geographic region. The computer instructions can cause the processor to perform operations for transmitting the new name authority pointer to a second directory server for provisioning the new name authority pointer to a second name server of a second regional call processing system responsive to determining that the telephone number is not located within the first geographic region.

FIG. 1 depicts an illustrative embodiment of a hierarchical telephone number mapping system 100 for a scalable and decentralized telephone number mapping is shown. Referring to FIG. 1, in one embodiment, the system 100 includes a national subscriber server 130 and a series of regional call processing sites 140, 150, 160, 170, and 180. For example, regional call processing sites 140-180 can be established for the North East, South East, North Central, South Central, and South regions of the nation, respectively. Other geographic or non-geographic regional devices are possible.

Figure 2:
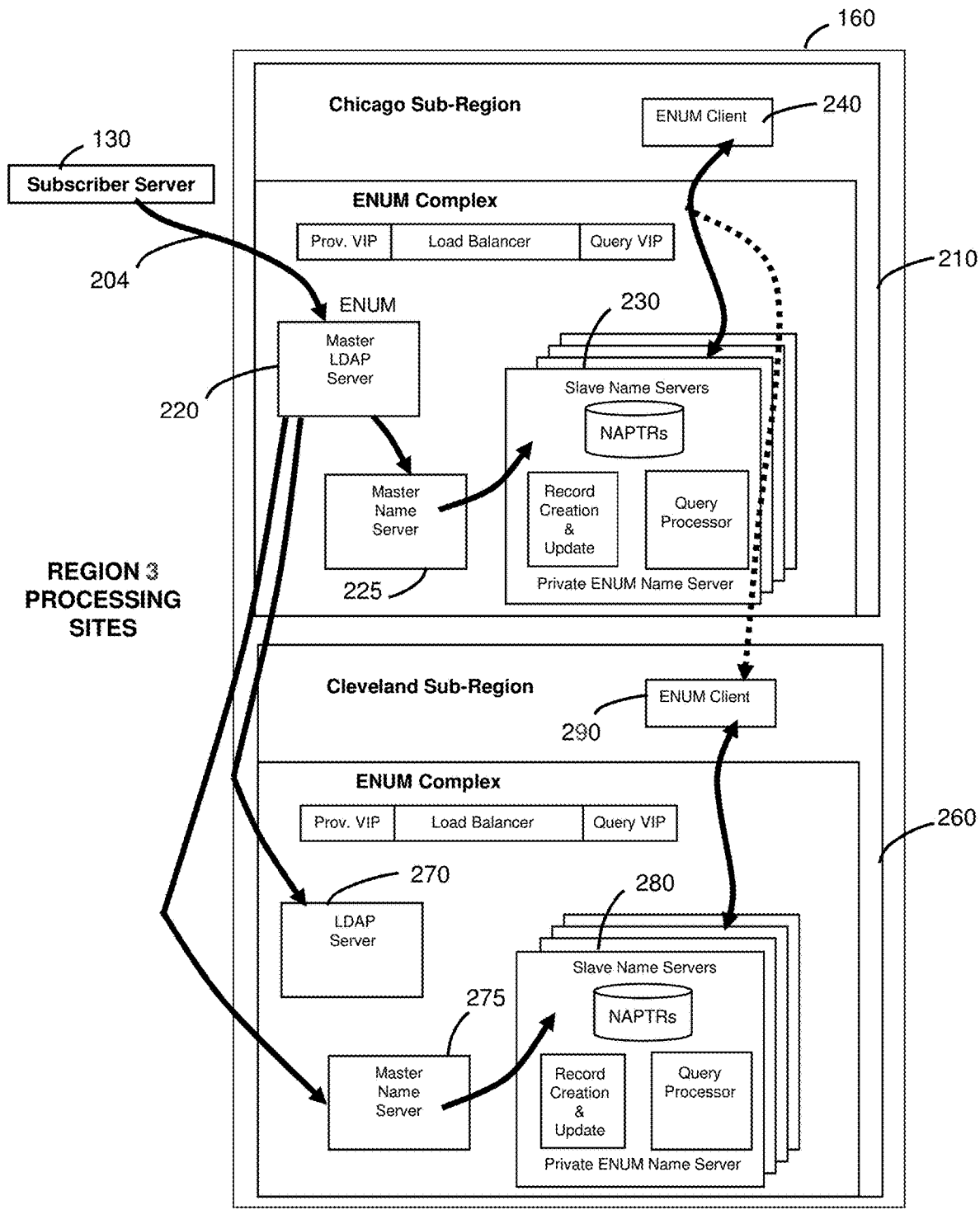
Figure 3A:
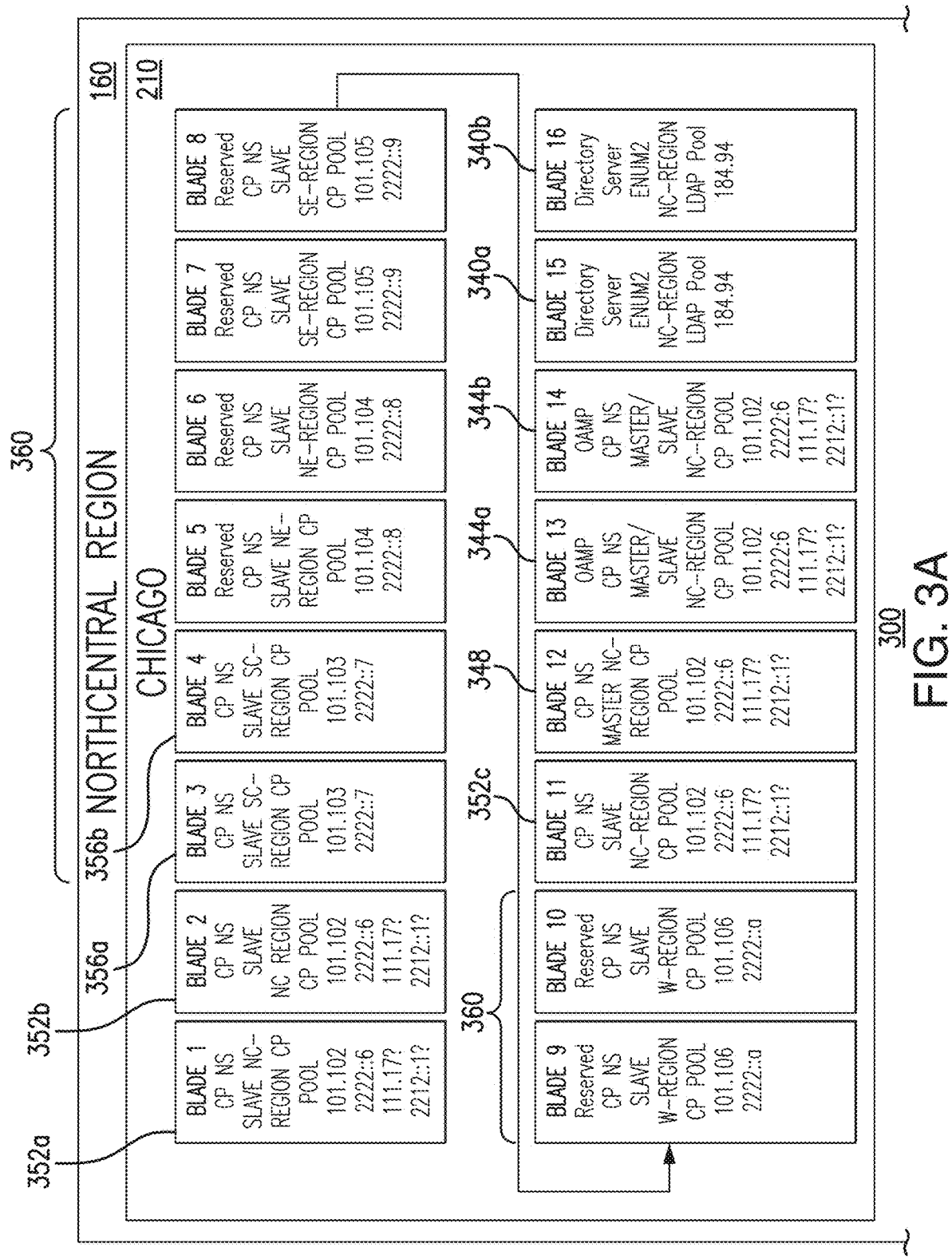
Figure 4A:
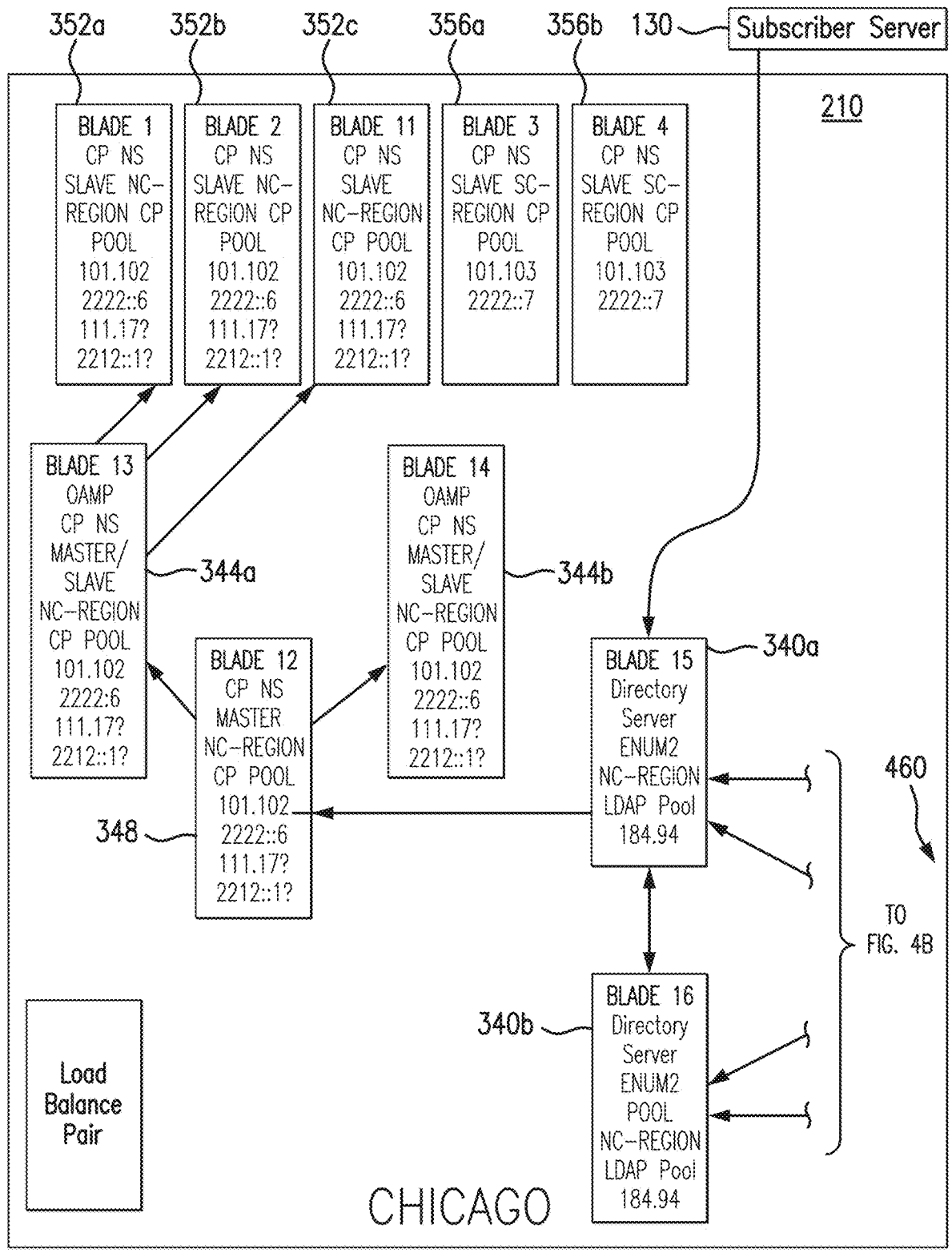
Figure 4B:
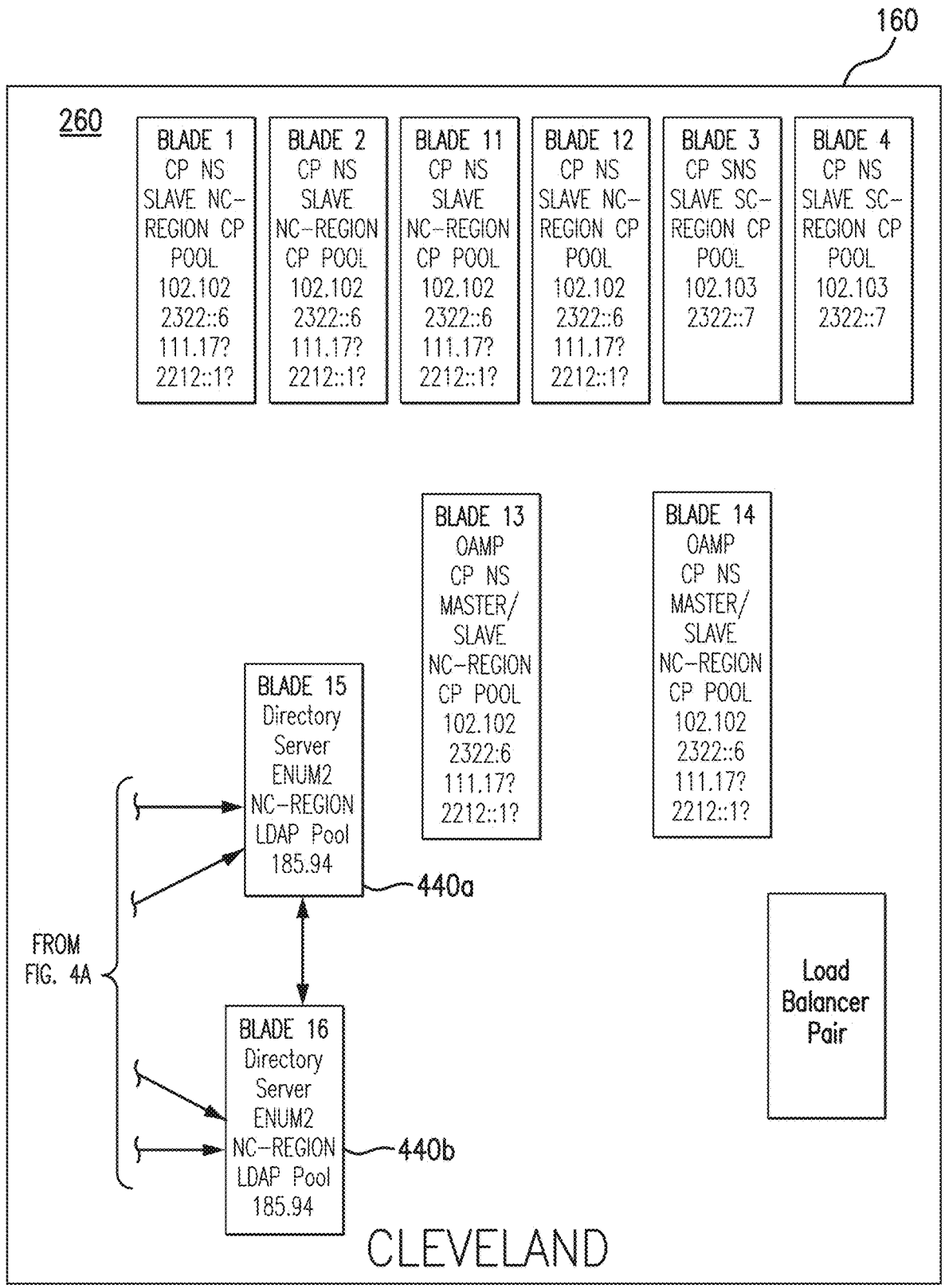
Figure 5A:
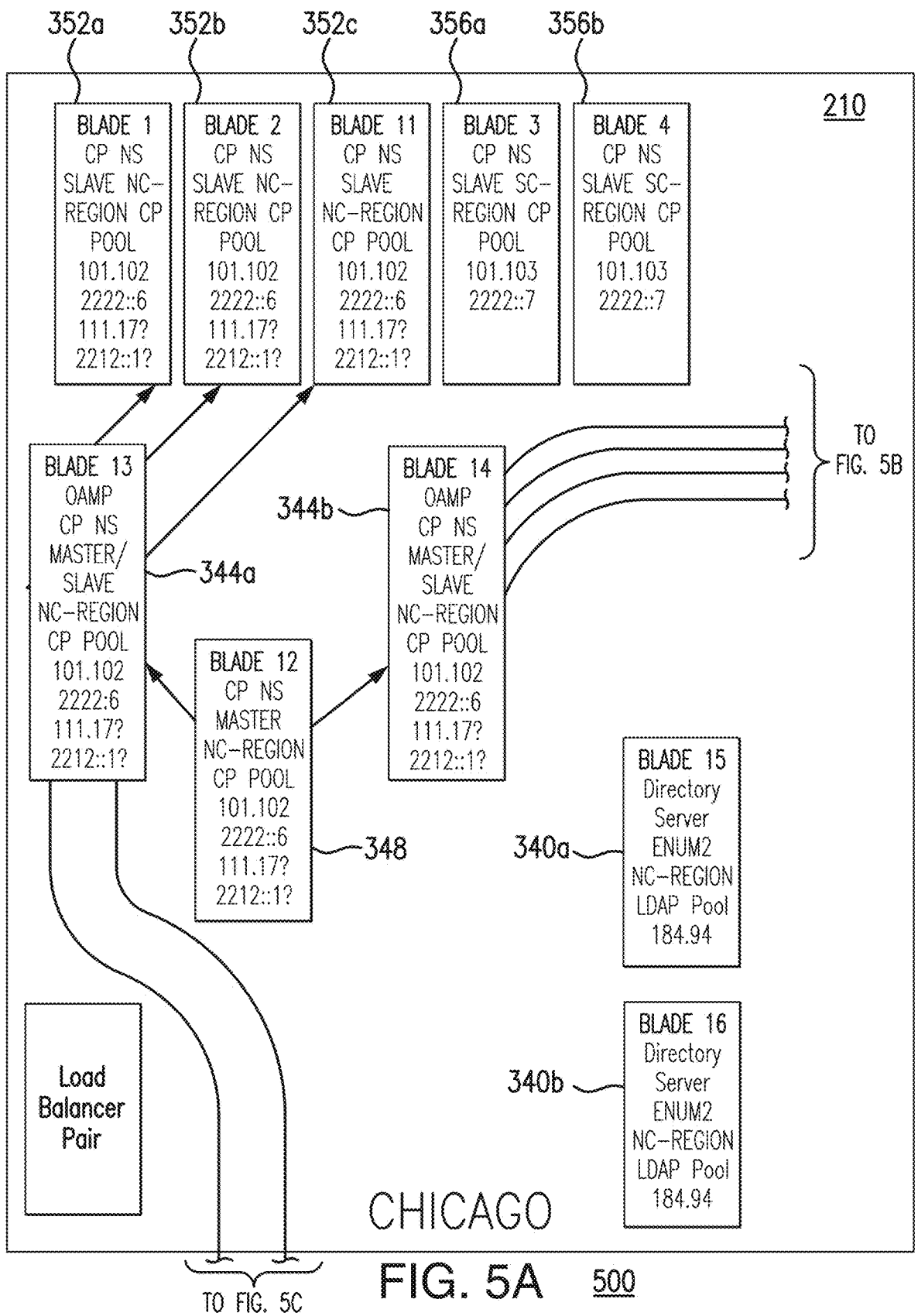
Figure 5B:
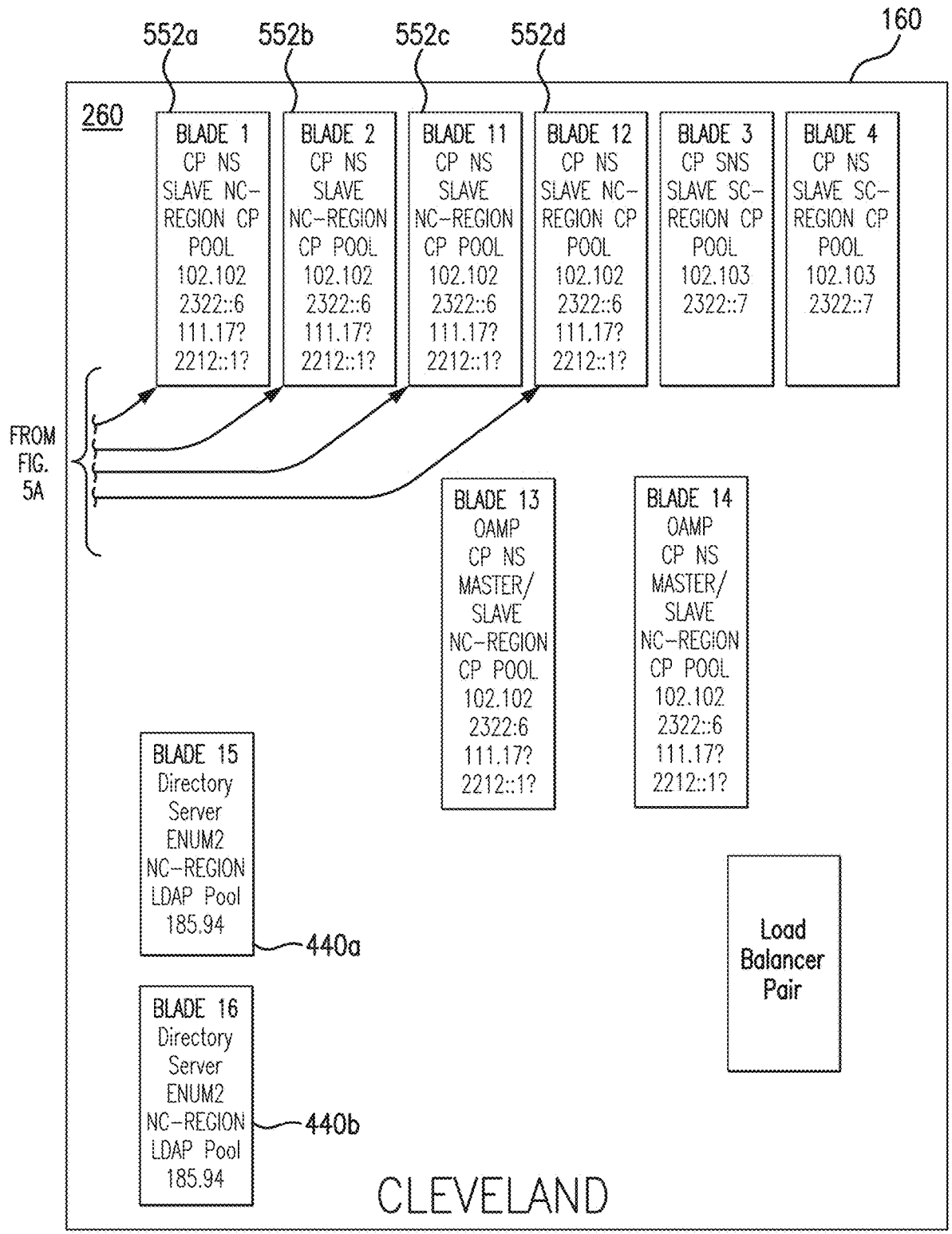
Figure 5C:
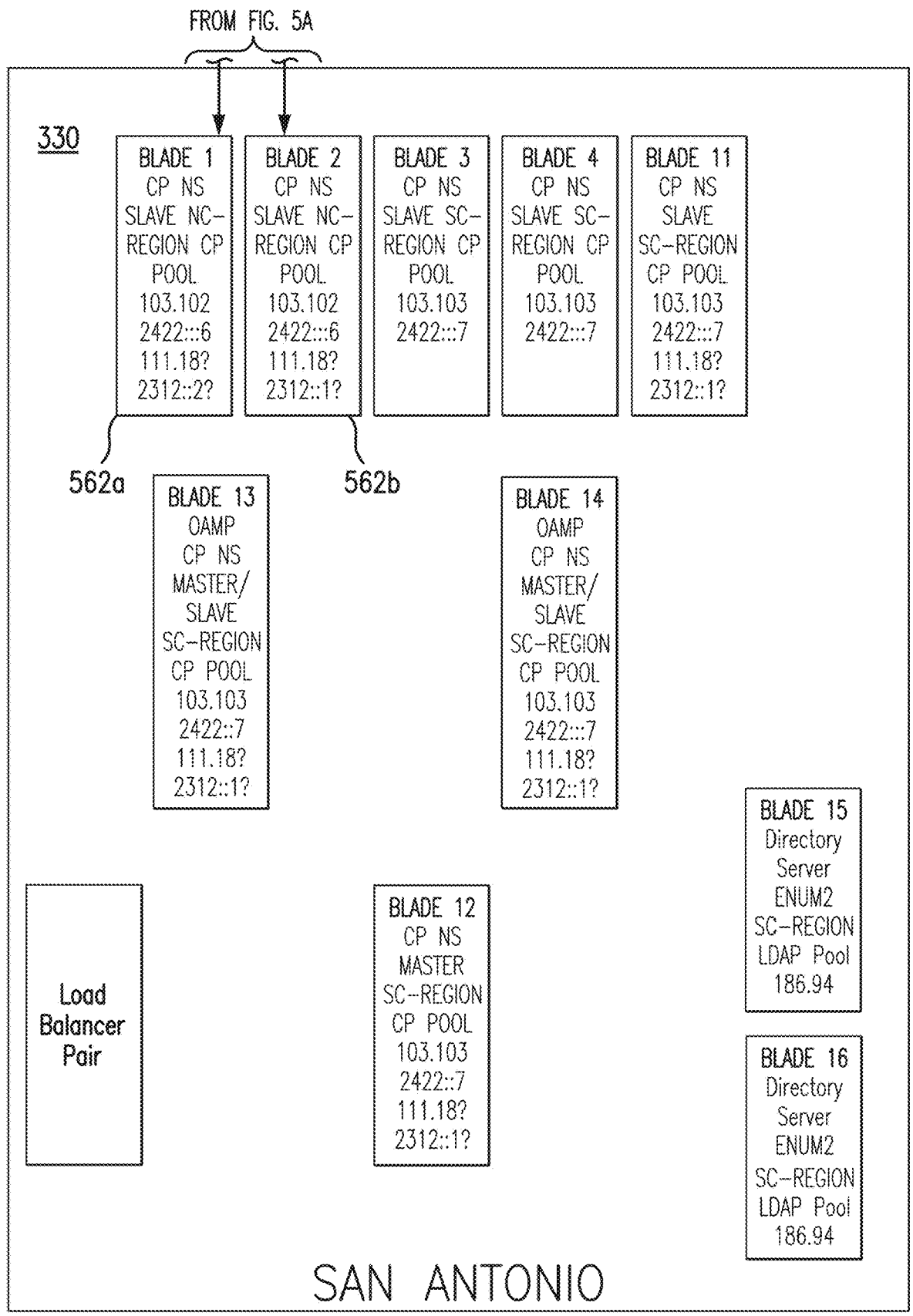
Figure 6A:
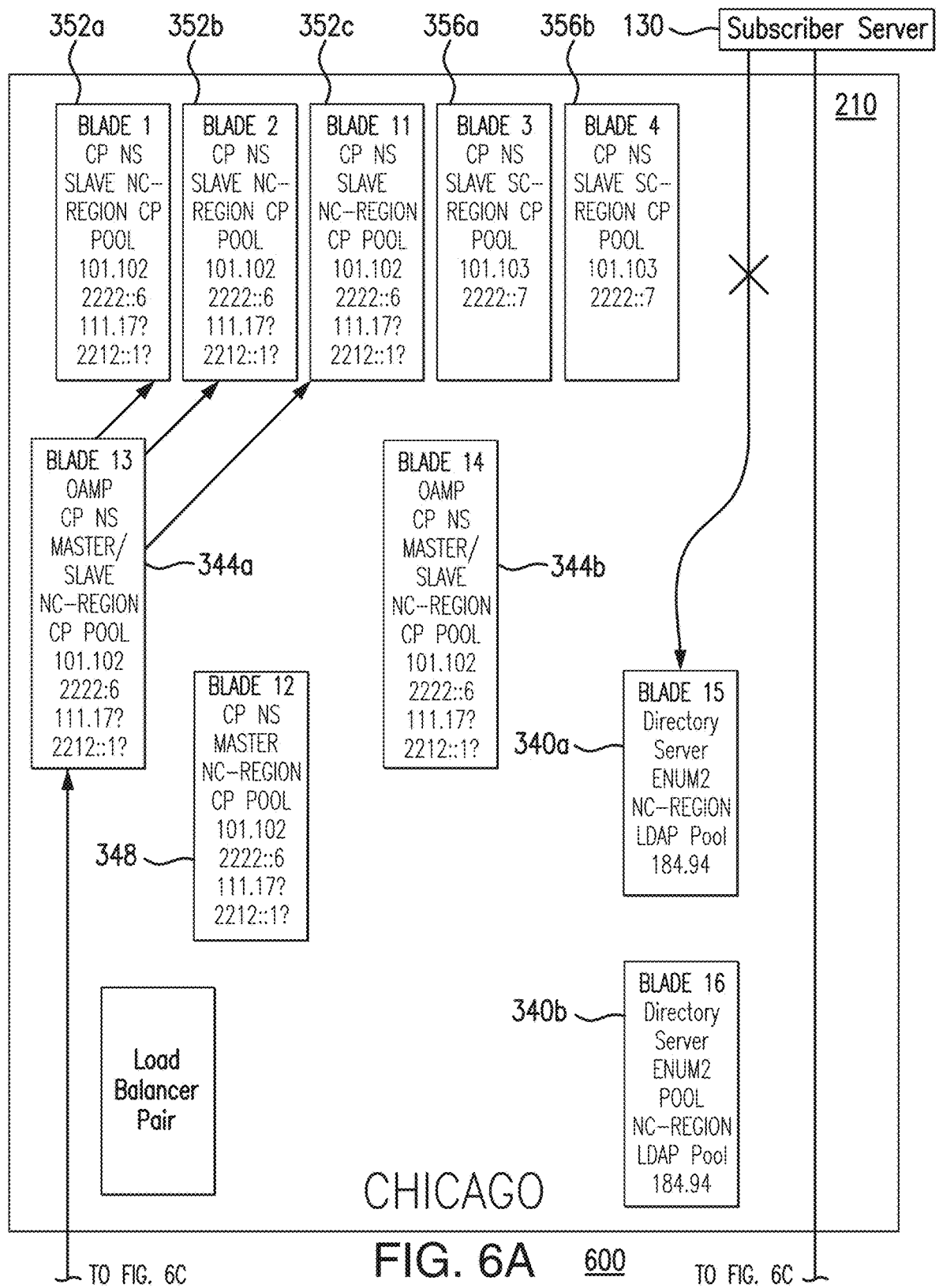
Figure 6B:
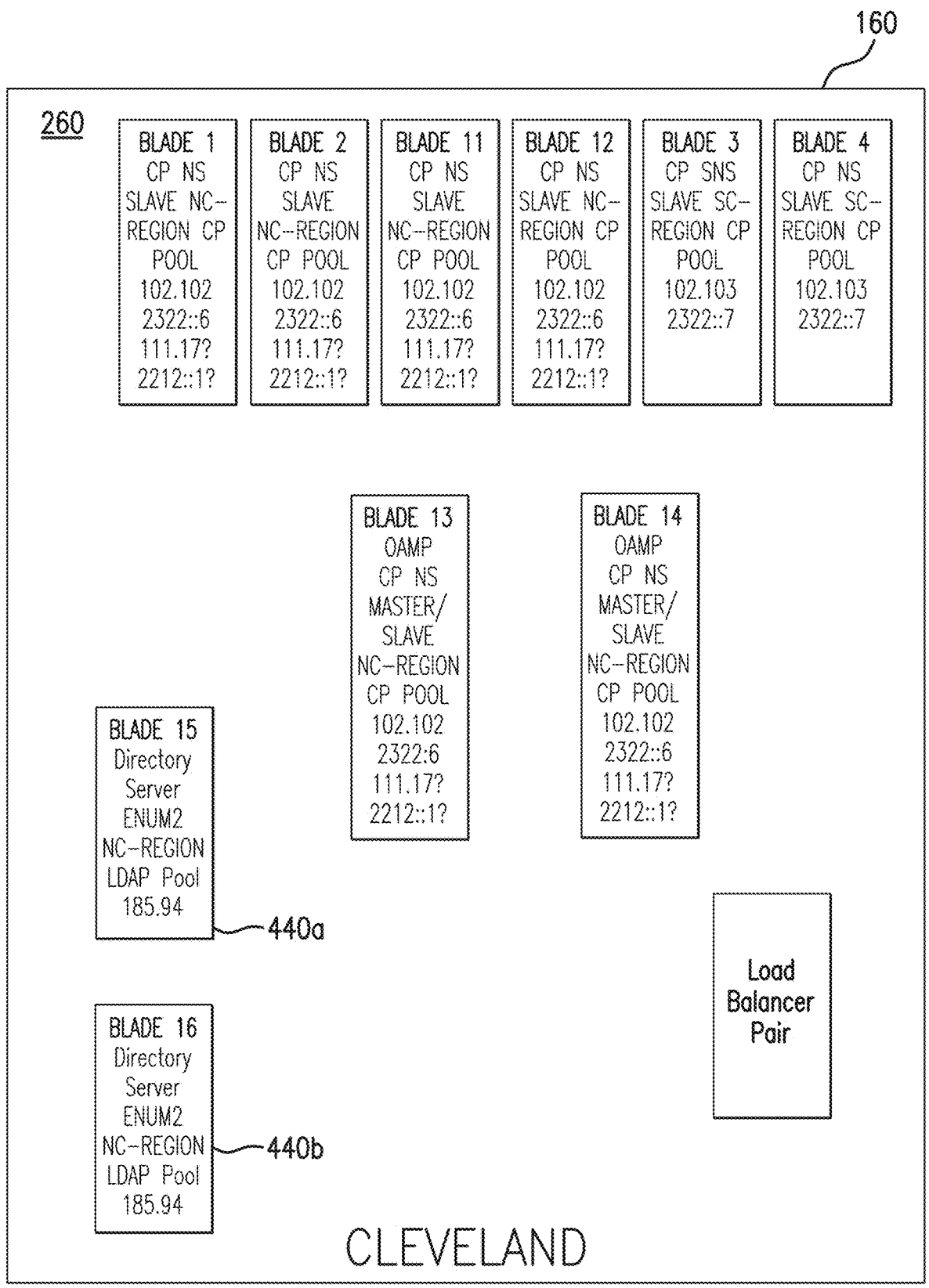
Figure 6C:
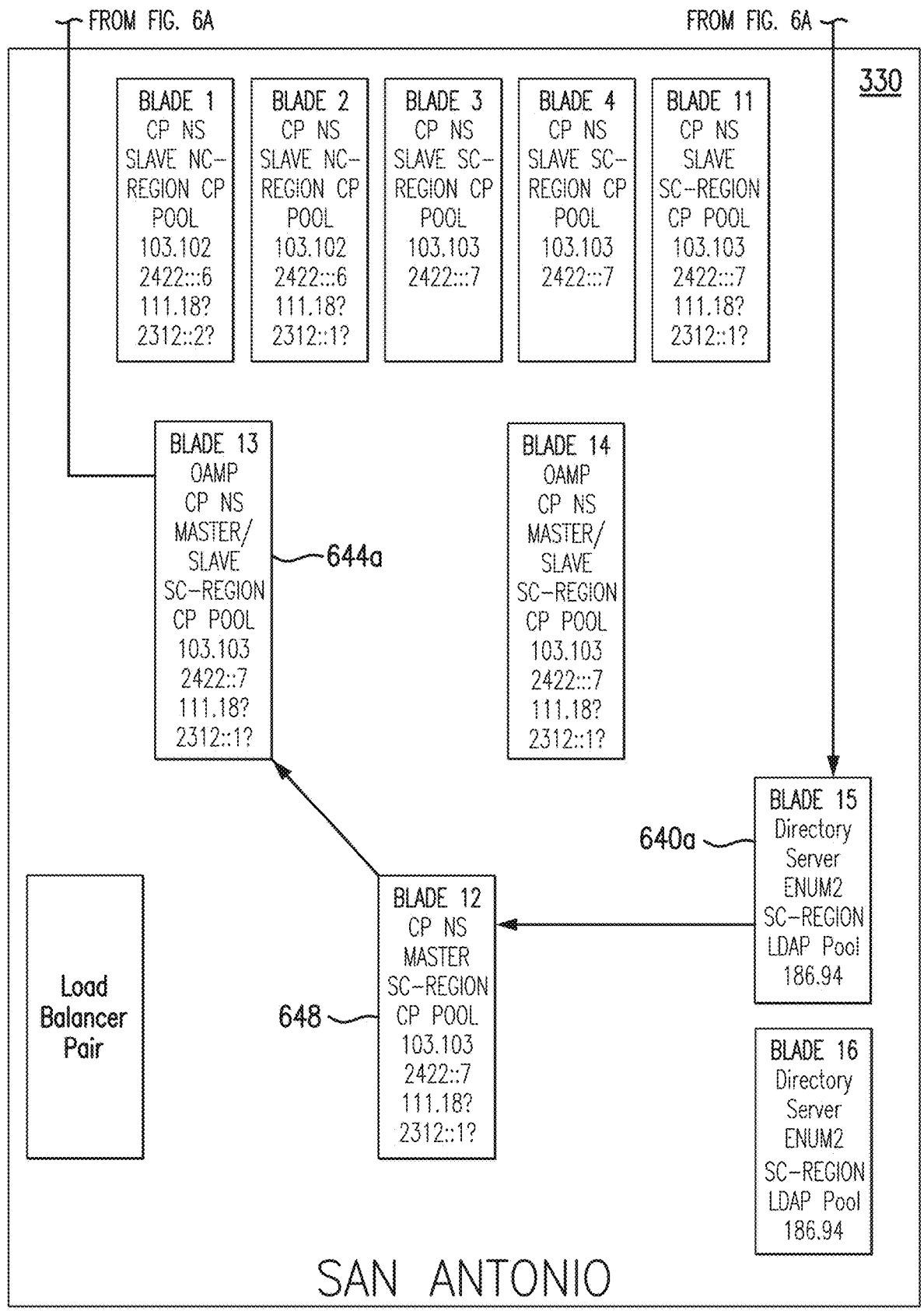
Figure 7A:
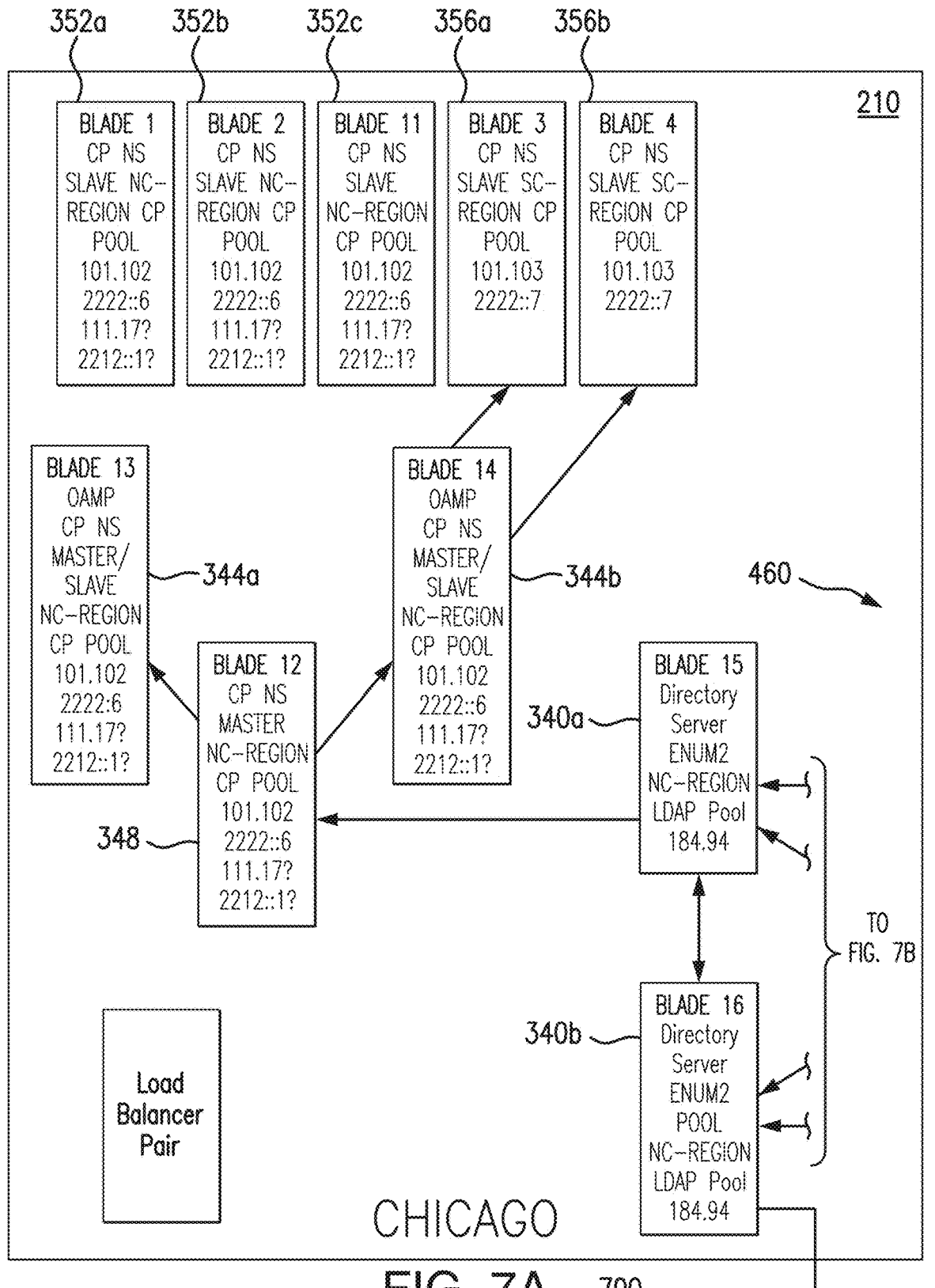
Figure 7B:
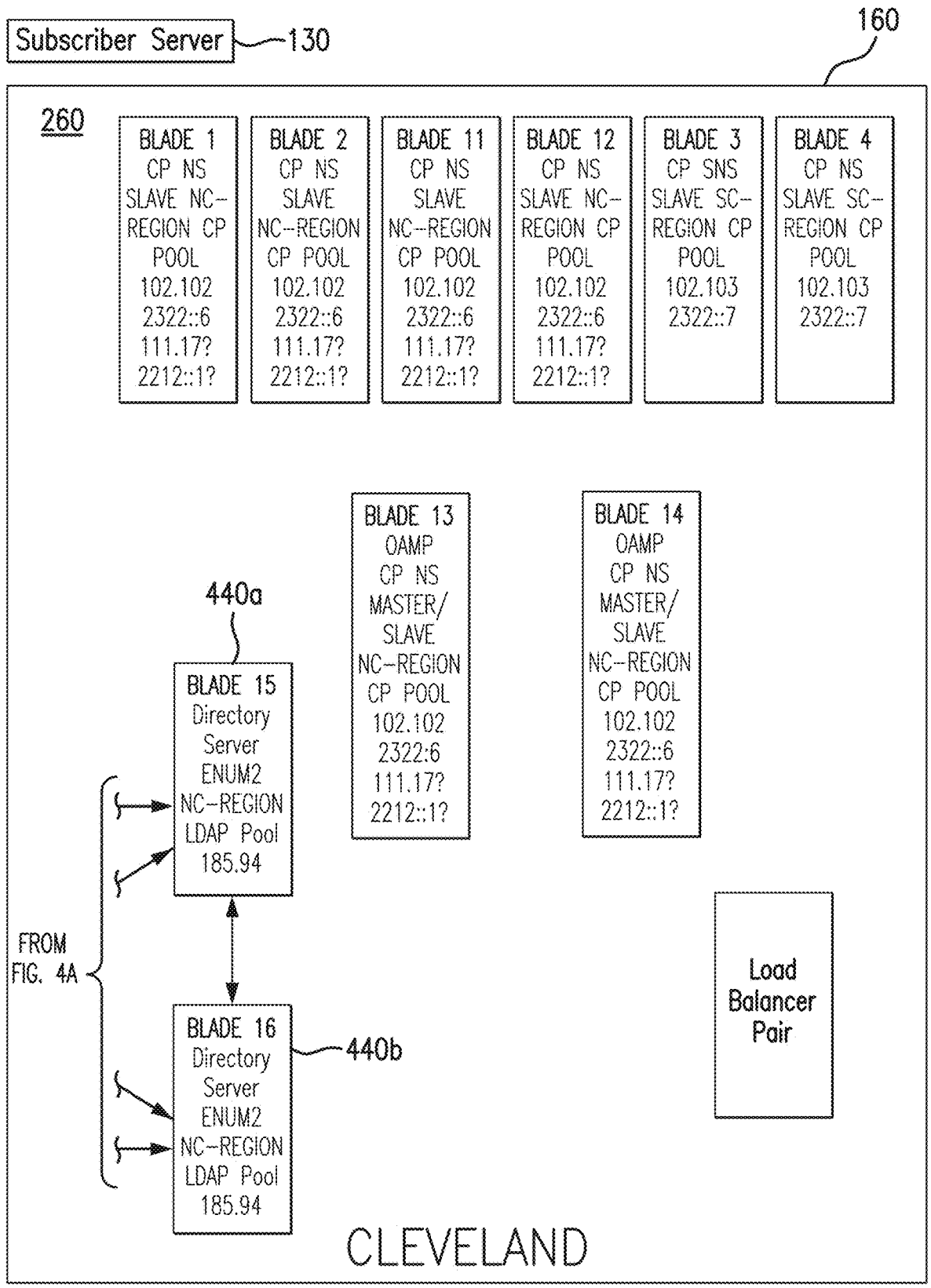
Figure 7C:
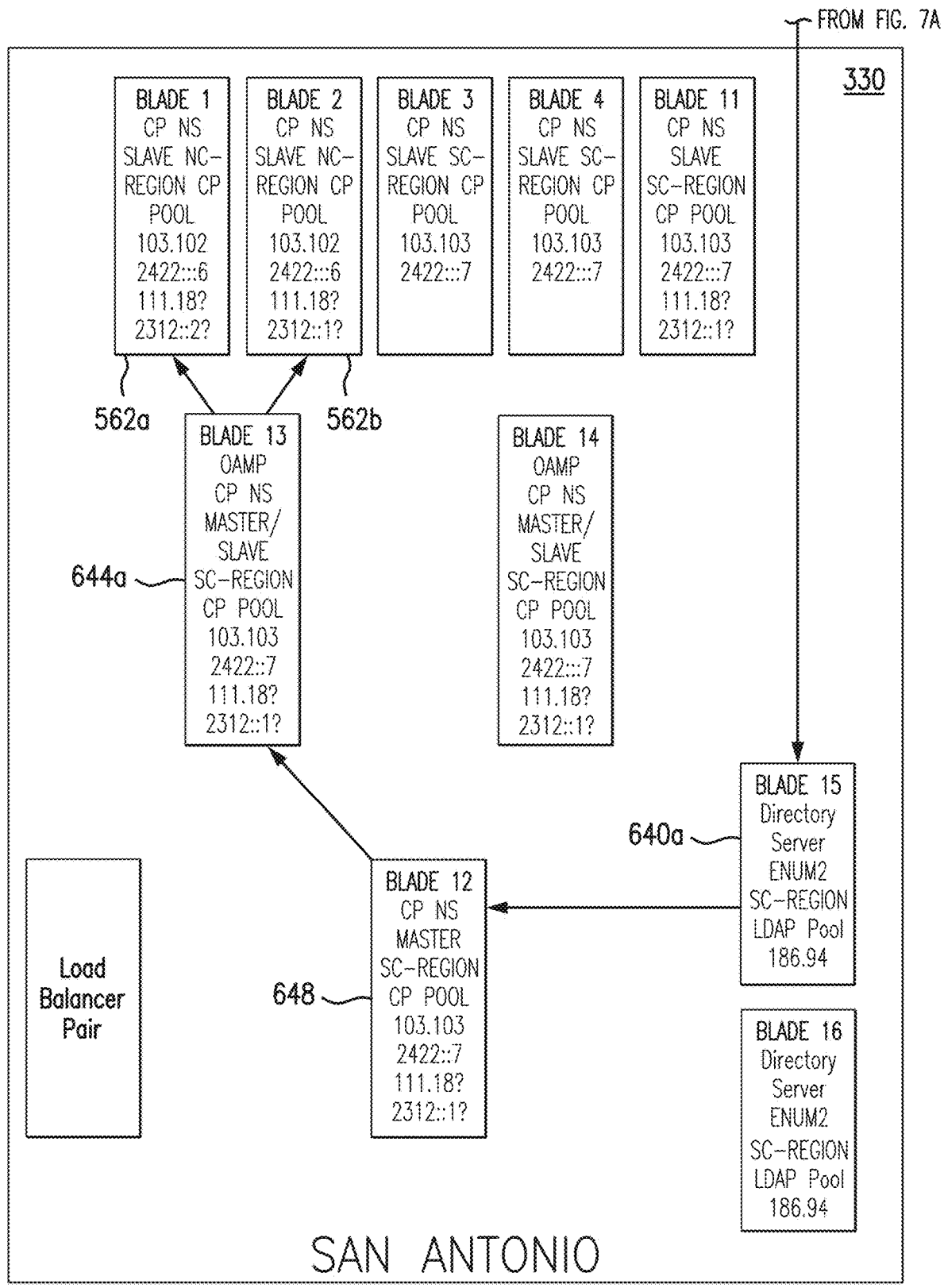
Figure 8:
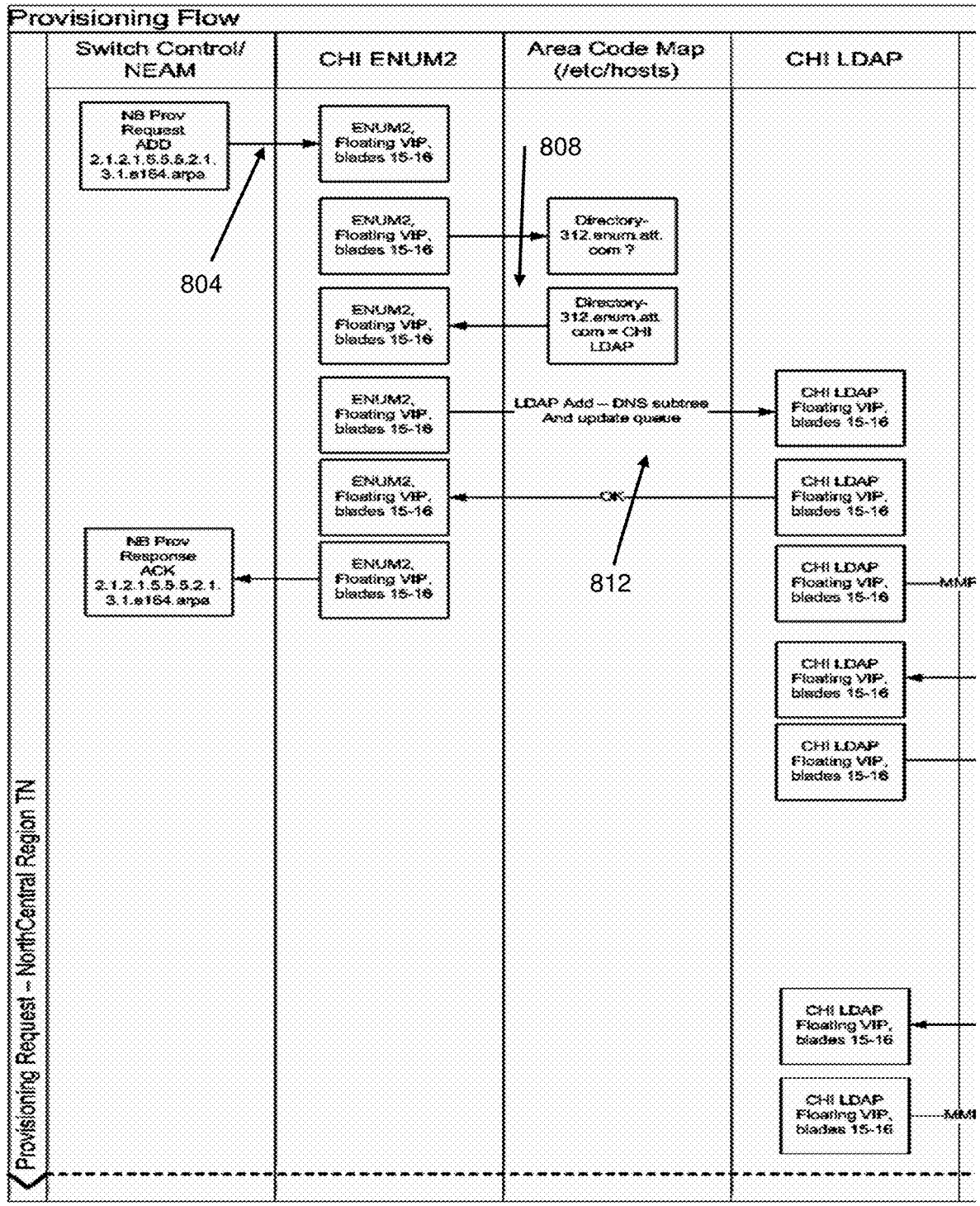
FIGS. 8-12 depict illustrative embodiments of data flow for provisioning name authority pointers within the communication systems of FIGS. 1, 2, 3A-3D, 4A-4D, 5A-5D, 6A-6D, 7A-7D and 14-15.
Figure 9:
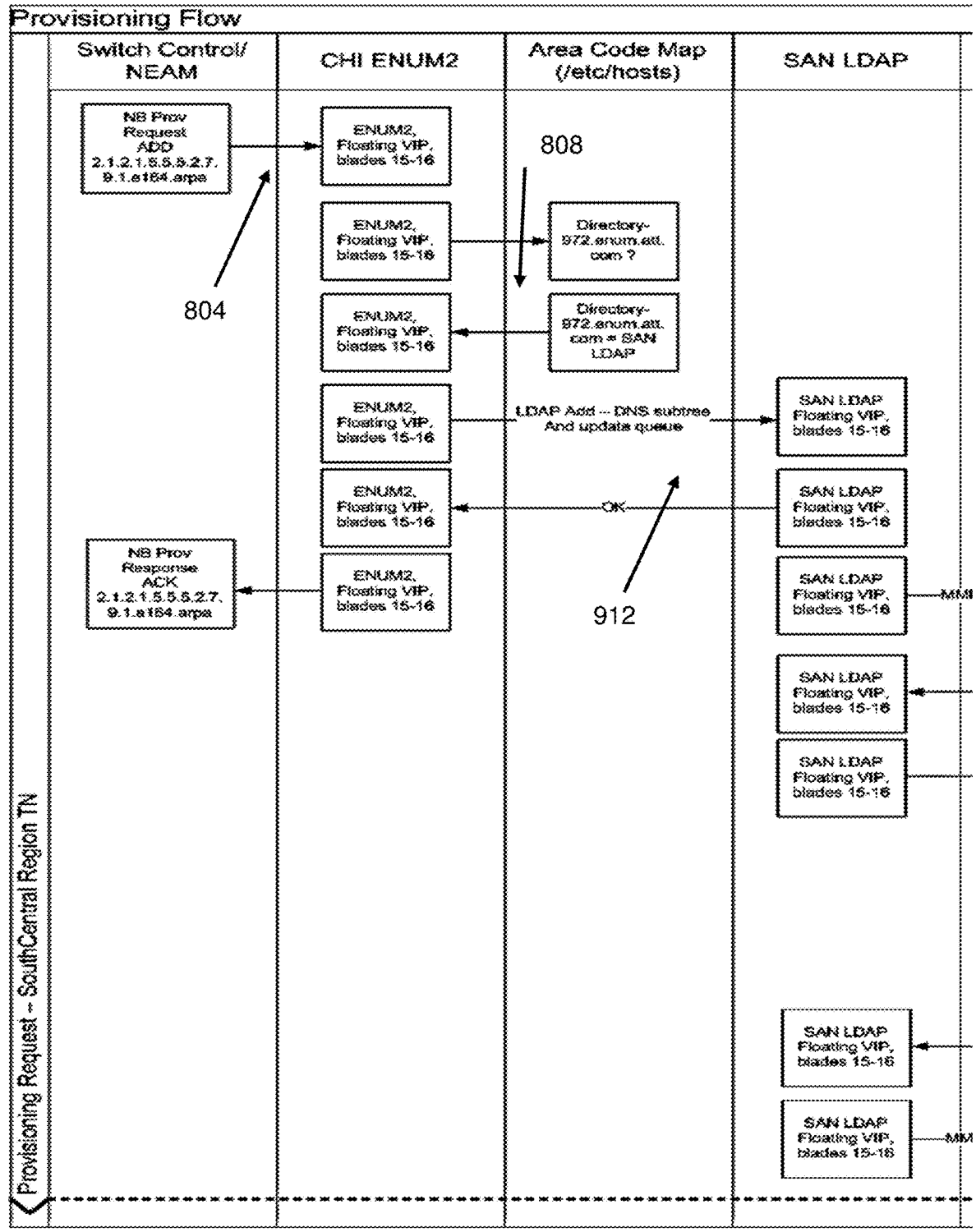
Figure 10:
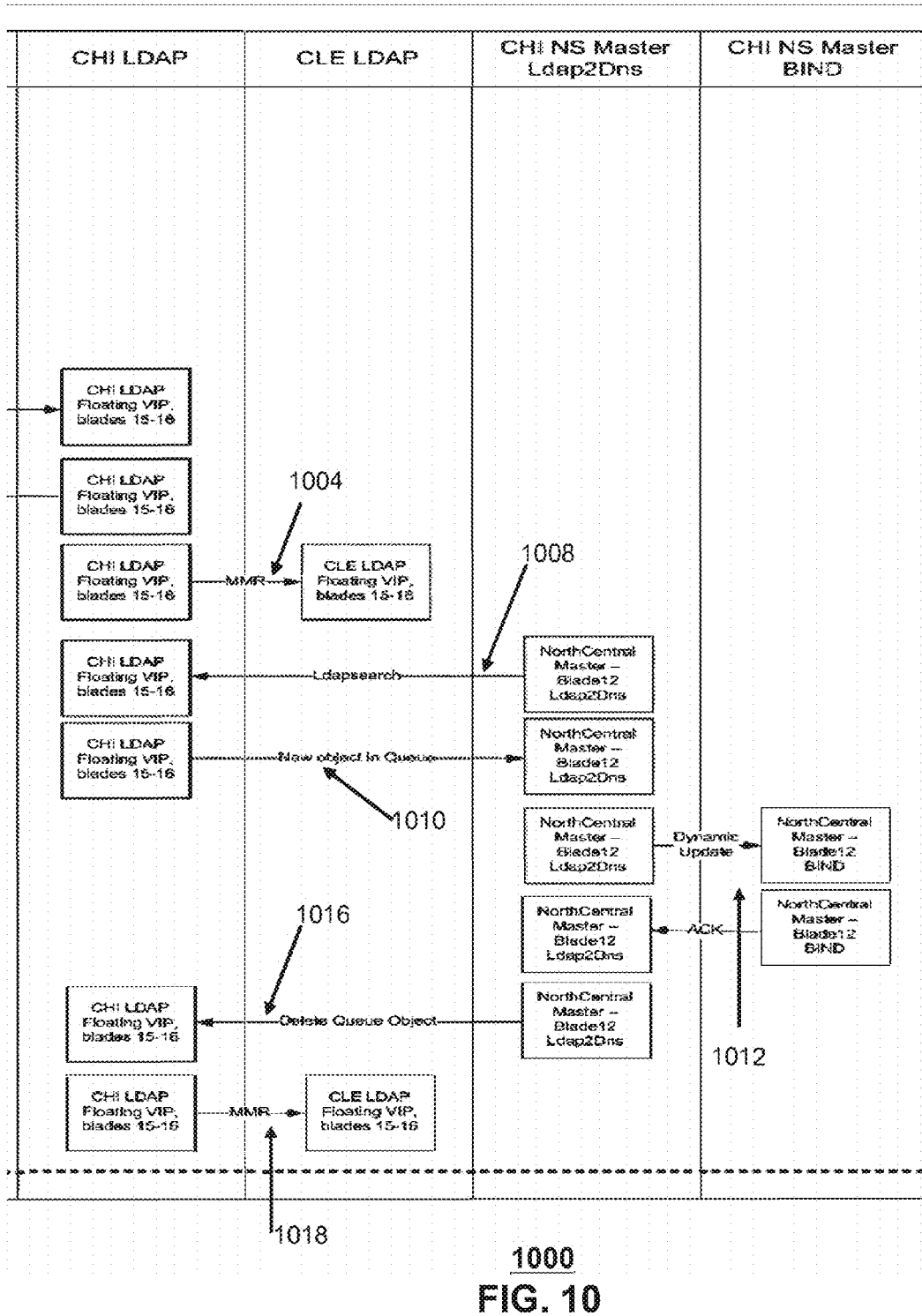
Figure 11:
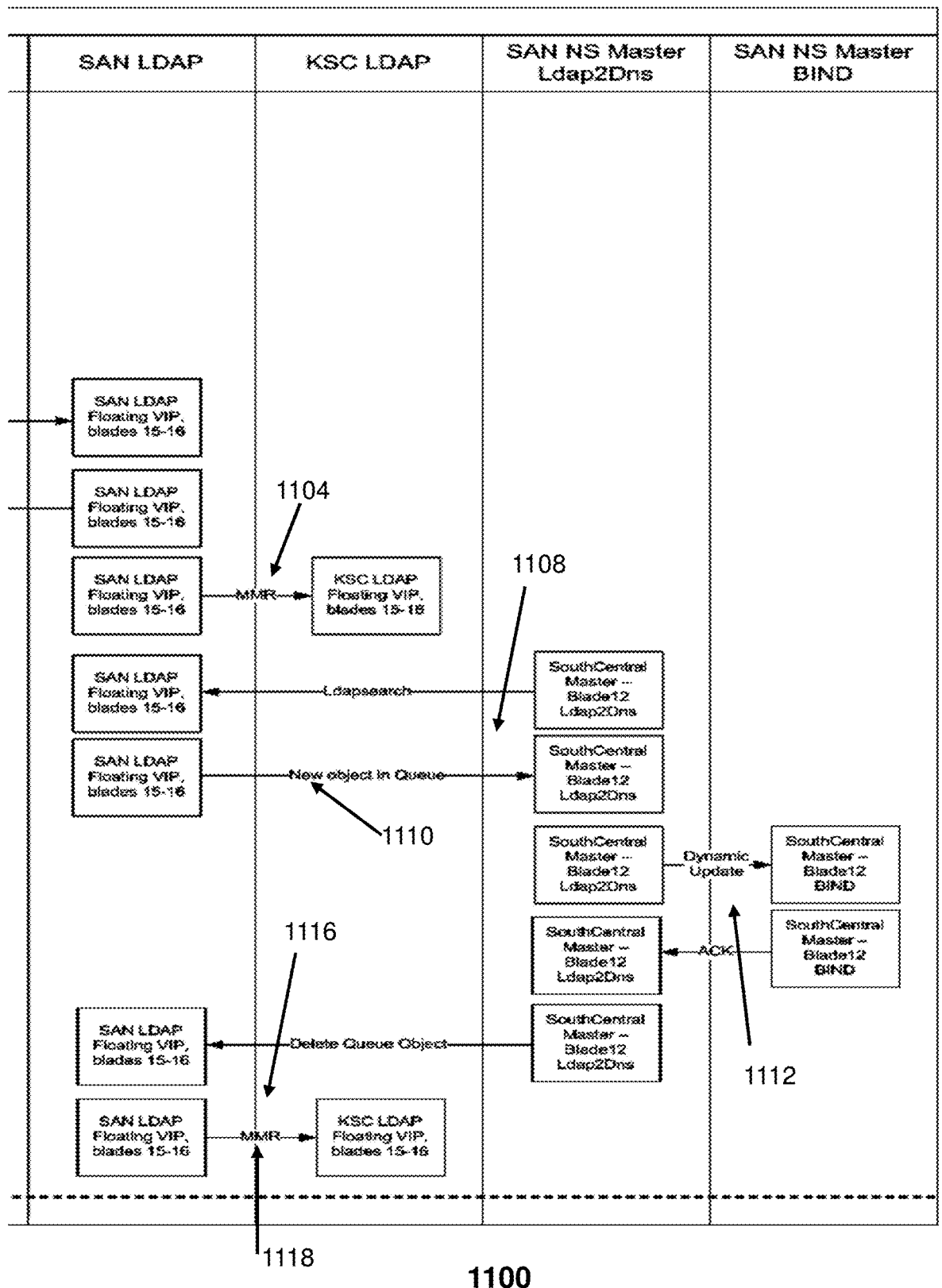
Figure 12:
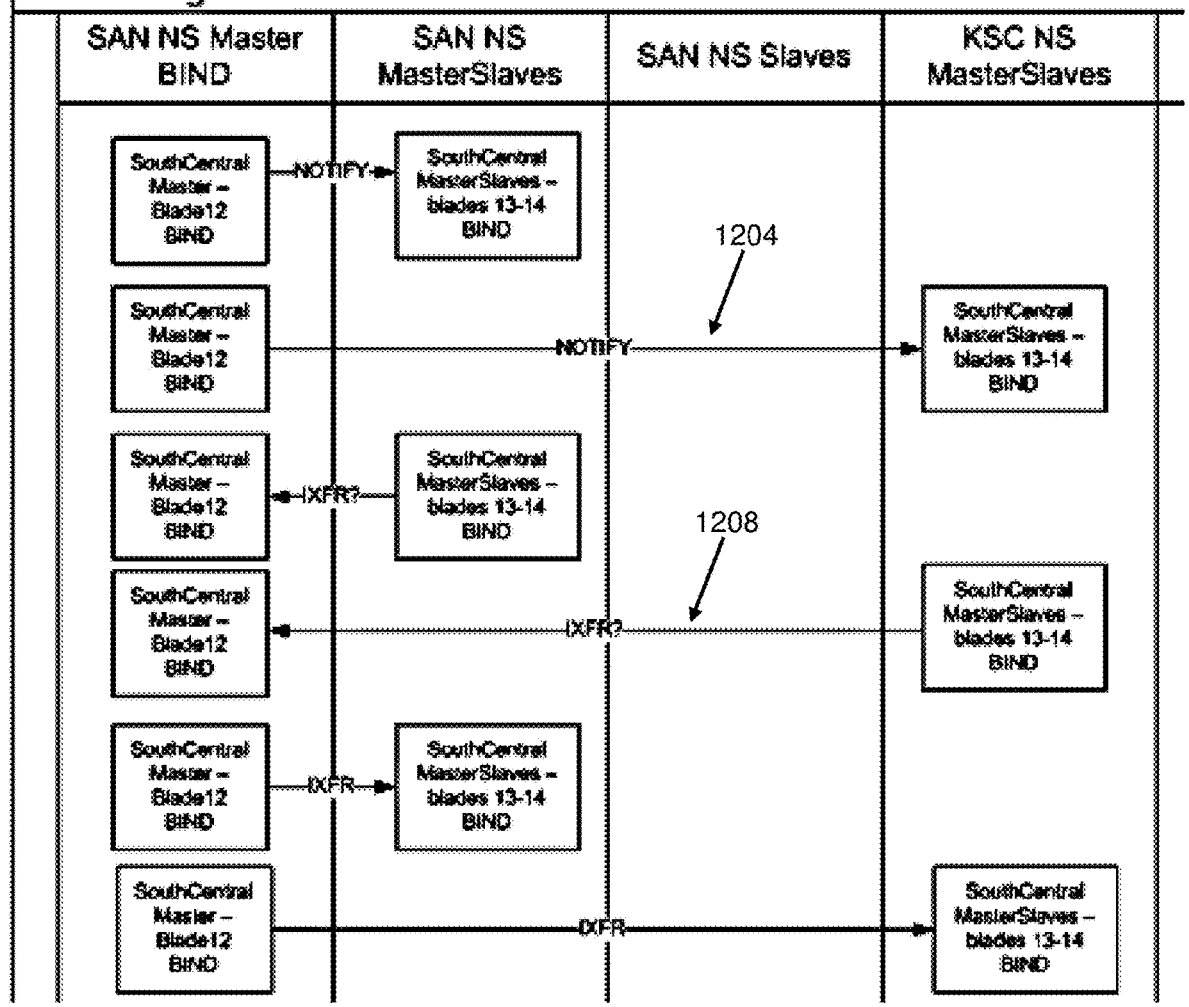

Referring now to FIG. 2, a regional processing site 180 of the hierarchical telephone number mapping system 100 is shown. The regional processing site 180 can be constructed from one or more sub-sites 210 and 260. For example, the region 3 (North Central) processing site 180 can be realized using a combination of two sub-sites 210 and 260, where each sub-site is in a different location within the North Central Region of the nation. In one example, the first sub-site 210 can be in the Chicago, Ill., and the second sub-site 260 can be in Cleveland, Ohio. Each sub-site 210 and 260 services the North Central region. In one embodiment, the sub-sites 210 and 260 within the regional processing site 180 are in interactive communication to facilitate sharing of workload.

In one embodiment, each regional sub-site 210 and 260 can include one or more lightweight directory access protocol (LDAP) servers 220 and 270. In one embodiment, a LDAP server 220, also called a directory server 220, executes provisioning software and acts as a master LDAP server 220. In one embodiment, in a nationwide system 100, an additional master LDAP server 220 can be configured at a different regional site. For example a first master LDAP server 220 can be configured at the North Central regional call processing site 150 while a second master LDAP server can be configured at the South Central site 170. With this technique either the North Central site 160 or the South Central site 170 can serve as the beginning point for provisioning subscription data throughout the system 100. In one embodiment, a subscriber server 130 can transmit new or updated subscriber data 204 to the system 100. In one embodiment, the subscriber data 204 can include name authority pointer (NAPTR) data that can provide an internet protocol address, such as a universal resource locator (URL) or a universal resource identifier (URI). The internet protocol address is associated with a telephone number so that a database of NAPTR records can provide an internet protocol address for a communication device in response to an input of a telephone number.

In one embodiment, only one master LDAP server 220 can be allowed to propagate changes through the system 100 to prevent synchronization issues. In one embodiment, one of the master LDAP servers 220 can be the preferred or default master while the other master LDAP server can be used as a slave LDAP server until needed. In a further embodiment, the other ENUM LDAP server 270 can be configured as a slave. In one embodiment, the master ENUM LDAP server 220 allows the sub-site 210 to process NAPTR replication processing regardless of the destination geographic area of the terminating device. In another embodiment, the master ENUM LDAP server 220 can be duplicated and distributed to other sites 140-180 and sub-sites 210 and 260 across the national telephony processing network 100. The slave ENUM LDAP server 225 can facilitate load balancing and redundancy for maximizing the efficiency of NAPTR replication processing while providing fault tolerance.

In one embodiment, NAPTR data 204 is delivered from the subscriber server 130 only to the currently active master LDAP server 220. In another embodiment the NAPTR data 204 can be replicated from the master LDAP server 220 to other LDAP servers 270. For example, multi-master replication (MMR) can be used to replicate the received NAPTR data 204. In one embodiment, NAPTR information 204 is issued by the subscriber server 130 in response to a change in status of a communication device of a communication system. For example, if a new communication device, such as a smart phone, is added to a communication system, then a NAPTR will be issued to link the device to a new or transferred telephone number and to an internet protocol address. In another example, a NAPTR will be issued when the telephone number of an existing device is changed or when the device adds or deletes a service function, such as internet data downloading.

In one embodiment, the processing sub-sites 210 and 260 include master name servers 225 and 275. The master name servers 225 and 275 can be used to propagate new or updated NAPTR records throughout the sub-region sites 210 and 260. In one embodiment, the master name servers 225 and 275 can receive NAPTR data from the master LDAP server 220. The master name servers 225 and 275 can then propagate the NAPTR data to banks of slave name server 230 and 280. In one embodiment, the banks of slave name servers 230 and 280 can include multiple additional in-region name servers and multiple additional out-of-region name servers. In one embodiment, the name servers are scalable to facilitate growth of usage and to account for regional imbalances in access. For example, a bank of slave name servers 230 can have a number of in-region name servers, where each in-region server can include a complete set of all NAPTR records corresponding to every telephone number in the geographic region of the North Central processing site 160. For instance, a sub-site 210 in Chicago, Ill., can include four in-region slave name servers in the slave name server bank 230, where each in-region server includes a complete NAPTR listing for all telephone numbers in the North Central region. If access patterns indicate that additional NAPTR lookup capacity is needed in the North Central region at the Chicago sub-site 210, then additional in-region servers can easily be added to the slave name server bank 230. In another embodiment, if usage patterns indicate a need for more capacity only in a particular NPA code region, such as only in the Illinois region, then one or more in-region slave name servers can be added to the slave name server bank 230, where the additional in-region slave name servers are confined to the sub-set of NPA codes for the specified North Central region.

In one embodiment, the slave server bank 230 at the sub-site 210 can include one or more servers that contain entire NAPTR sets for out-of-region telephone numbers. For example, the Chicago sub-site 210 can include one or more out-of-region slave name servers with the NAPTR set for all telephone numbers in the South Central Region that includes Texas, Oklahoma, and Louisiana. Similarly, the Chicago sub-site 210 can include one or more out-of-region slave name servers 630 for the other national regions (North East, West, and South East). In another embodiment, additional out-of-region slave name servers 230 can be added to accommodate usage patterns.

The combination of in-region and out-of-region slave name servers 230 at the slave name server bank 230 for each sub-site 210 facilitates processing of any national telephone number at any sub-site. In addition, dividing the NAPTR sets between in-region and out-of-region slave name servers in the slave name server banks 230 allows the overall database for each slave name server to be maintained at a sufficiently small size to facilitate efficient query search and response. Furthermore, since in-region and out-of-region slave name server capacity can be added or subtracted from the slave name server bank 230 of the sub-site 210, it is possible to optimize NAPTR response time at the regional processing site 180 or sub-site 210 without requiring interstate communication or excessive equipment.

In one embodiment, the processing site 180 is provisioned by a subscriber server 130 that can collect, catalog, and distribute NAPTR records that link telephone numbers to IP addresses for communication devices. In one embodiment, the subscriber serer 130 can access telephone number and IP address data for communication devices subscribed for usage on a communication system In one embodiment, the subscriber server 130 can distribute NAPTR data 204 to the master LDAP server 220 at a regional processing site 180 or a sub-site 210. The NAPTR data 204 can include records for in-region telephone numbers and for out-of-region telephone numbers. The master LDAP server 220 can further distribute the NAPTR sets to the master name servers 225 and 275 for further distribution to the slave name servers 230 and 280.

In one embodiment, a sub-site 180 can be accessed whenever a call session from a communication system is initiated within the geographic region of the sub-site 180. In one embodiment, a query is initiated that is forwarded to the sub-site 210, 260 that is closest to the calling party. For example, a call initiated near the Chicago sub-site 180 can be processed at the Chicago sub-site 180. In other embodiment, the query can be routed to either sub-site 180 depending on operational factors, such as capacity, volume of calls, maintenance, and/or down time at the sub-sites. In one embodiment, the query can be handled by an ENUM client 240 at the sub-site 210. The ENUM client 240 can determine whether the telephone number of the terminating device that is referenced by the query is a number that is within the geographic region of the site 180. In one embodiment, the ENUM client 240 can compare the NPA code of the terminating communication device to a set of NPA codes for the sub-site 180. If the telephone number is within the region, then the ENUM client 240 can send a request to an in-region slave name server at the slave name server bank 230 for a NAPTR associated with the number. If the telephone number is not in-region, then the ENUM client can further process the query by determining which region of the national system matches the telephone number. For example, the ENUM client 240 can compare the NPA of the telephone number to a set of all NPA codes in the national system and determine which region corresponds to the NPA code. In one embodiment, the ENUM client 240 can then forward a request for the NAPTR to the correct out-of-region slave naming server at the slave name server bank 230 of the sub-site 210.

In one embodiment, the ENUM client 240 at the sub-site 210 can forward the received query to another sub-site 260. For example, a query received at the Chicago sub-site 210 can be forwarded to the Cleveland sub-site 260 for processing. In one embodiment, forwarding can be initiated by a lack of availability of the ENUM client 240 or by an over-loading of the sub-site 210. In another embodiment, an availability issue with any part of the sub-site 210, such as with any part of the name servers 230 can trigger a re-routing of the query from the first sub-site 210 to the second sub-site 260. In one embodiment, the ENUM client 240 of a first sub-site 210 can submit the request to the ENUM client of the second sub-site. In another embodiment, the first ENUM client 240 can directly access a regional slave name server bank 280 at the second sub-site 260, without re-routing the query to the ENUM client 290 of the second sub-site 260.

FIGS. 3A-3D depict illustrative embodiments of the hierarchical telephone number mapping system 100. Server installations for the North Central regional processing site 205 and the South Central regional processing site 170 are shown. In one embodiment, an entire national telephone processing system can be implemented through the combination of the North Central regional processing site 160 and the South Central regional processing site 170 by performing call processing for all of the five regions at the two regional sites 160 and 170. In another embodiment, additional regional processing sites 140, 180, and 190 can be added to North Central regional processing site 160 and the South Central regional processing site 170 to increase capacity and/or improve throughput.

In one embodiment, each regional processing site 160 can include multiple sub-sites 210 and 260. For example, the North Central regional processing site 160 can include a Chicago sub-site 210 and a Cleveland sub-site 160. In another example, the South Central regional processing site 170 can include a San Antonio sub-site 330 and a Kansas City sub-site 335. In one embodiment, server components of each of the sub-sites 210 and 260 of a regional processing site 160 can communicate with one another, can share configuration and update data, and can off load processing tasks to facilitate efficient processing of call session data. In one embodiment, each sub-site 210 can include two LDAP servers 340a and 340b, two operations, administration, maintenance, and provisioning (OAMP) servers 344a-344b, one master name server 348, three in-region slave name servers 352a, 352b, and 352c, and eight out-of-region slave name servers 360. For the Chicago sub-site 210, each one of the two LDAP server 340a and 340b can be configured as a master LDAP server for local fail over.

FIGS. 4A-4D depict illustrative embodiments of the hierarchical telephone number mapping system 100. Details for provisioning NAPTR data into slave name servers 352a-c are illustrated. Provisioning data is generated by the subscriber server 130 and delivered to the master LDAP server 340a. In this embodiment, the master LDAP server 340a is located at the Chicago sub-site 210 of the North Central regional processing site 160. In one embodiment, the master LDAP server 340a can temporarily store the received NAPTR data at a directory. In one embodiment, each of the LDAP servers 340a-b of the North Central regional processing site 160 are synchronized such that all of these LDAP servers 340a-b reflect the most current NAPTR updating. In one embodiment, the LDAP servers 340a-b synchronize using multi-master replication.

In one embodiment, the master name server 348 for the North Central regional processing site 160 monitors the directory of the North Central region LDAP servers 340a-b for an indication that new NAPTR data has been received. For example, the master name server 348 can perform a directory search on any of the regional LDAP servers 340a-b to determine if a new NAPTR has been received, which could change the current NAPTR data configuration for the North Central region or zone. When the master name server 348 determines that new NAPRT data has been received, then master name server 348 requests the NAPTR data and receives the NAPTR data from one of the LDAP servers 340a-b. In one embodiment, the master name server 348 notifies the OAMP servers 344a-b for the sub-site 210 to inform these servers 344a-b of the availability of new NAPTR data. In one embodiment, the OAMP servers 344a-b request and receive the new NAPTR data from the master name server 348 to propagate the new NAPTR data to the OAMP servers 344a-b. In another embodiment, the OAMP servers 344a-b notify the in-region slave name servers 352a-c for the sub-site 210 to inform these slave name servers 352a-c of the availability of new NAPTR data. In one embodiment, the in-region slave name servers 352a-c request and receive the new NAPTR data from the OAMP servers 344a-b to propagate the new NAPTR data to the in-region slave name servers 352a-c.

FIGS. 5A-5D depict illustrative embodiments of the hierarchical telephone number mapping system 100. Additional details for provisioning NAPTR data into slave name servers are illustrated. In one embodiment, the OAMP servers 344a-b can further notify slave name servers 552a-d that are in-region for the North Central processing site 160 but that are located at the Cleveland sub-site 260 to inform these other in-region slave name servers 552a-d of the availability of new NAPTR data. In addition, the OAMP servers 344a-b can further notify slave name servers 562a-b that are out-of-region for the South Central processing site 170 and are located at the San Antonio sub-site 330. In one embodiment, the Cleveland in-region slave name servers 552a-d and the San Antonio out-of-region slave name servers 562a-b can request and receive the new NAPTR data from the OAMP servers 344a-b to propagate the new NAPTR data through both regional processing sites 160 and 170.

In one embodiment, the in-region slave name servers 352a-c request and receive the new NAPTR data from the OAMP servers 344a-b to propagate the new NAPTR data to the in-region slave name servers 352a-c.

FIGS. 6A-6D depict illustrative embodiments of the hierarchical telephone number mapping system 100. Additional details for provisioning NAPTR data into slave name servers are illustrated. In one embodiment, the subscriber server 130 prefers the master LDAP server 340a at the Chicago sub-site for provisioning NAPTR data. However, in another embodiment, the subscriber server 130 can detect a failure at the master LDAP server 340a and can respond to that failure by switching to a different master LDAP server at either the Chicago sub-site 210, at another sub-site 260 in the same regional processing site 160, or at another regional processing site 170. In one embodiment, the subscriber server 130 can be configured to automatically switch to the San Antonio master LDAP server 640a upon a failure at the Chicago master LDAP server 340a to provide a redundant provisioning path via a different geographic region.

FIGS. 7A-7D depict illustrative embodiments of the hierarchical telephone number mapping system 100. Additional details for provisioning NAPTR data into slave name servers are illustrated. In one embodiment, the master LDAP server 340a can determine the geographic location of a newly received NAPTR based on the NPA code (area code) of the telephone number embedded in the NAPTR. For example, the master LDAP server 340a can determine from a NPA code of 312 that the NAPTR is for a communication device in the North Central region. In another example, the master LDAP server 340a can determine from a NPA code of 972 that the NAPTR is for a communication device in the South Central region. Where the master LDAP server 340a determines that the NAPTR is for the South Central region, then one of the LDAP servers 340a-b copies the new NAPTR to a LDAP server 640a at the San Antonio sub-site 330 of the South Central region 170.

In one embodiment, the master name server 648 for the South Central regional processing site 170 monitors the directory of the South Central region LDAP servers 640a for an indication that new NAPTR data has been received. For example, the master name server 648 can perform a directory search on any of the regional LDAP servers 640a to determine that a new NAPTR has been received which would change the current NAPTR data configuration for the South Central region or zone. When the master name server 648 determines that new NAPRT data has been received, then master name server 648 requests the NAPTR data and receives the NAPTR data from the LDAP server 640a. In one embodiment, the master name server 648 notifies an OAMP server 644a for its sub-site 330 to inform of the availability of new NAPTR data. In one embodiment, the OAMP server 644a requests and receives the new NAPTR data from the master name server 648 to thereby propagate the new NAPTR data to the OAMP servers 644a. In another embodiment, the OAMP server 644a notifies the in-region slave name servers 562a-b for the sub-site 330 to inform of the availability of new NAPTR data. In one embodiment, the in-region slave name servers 652a-b can request and receive the new NAPTR data from the OAMP server 644a to propagate the new NAPTR data to the in-region slave name servers 562a-b.

In another embodiment, the master name server 348 for the North Central regional processing site 170 can monitor the directory of the North Central region LDAP servers 340a-b for an indication that new NAPTR data has been received that would change the current NAPTR data configuration for out-or-region slave name servers at the North Central region or zone. The master name server 348 can requests and receive the NAPTR data from an LDAP server 340a-b. In one embodiment, the master name server 348 can notify the sub-site OAMP server 344a-b of the availability of new NAPTR data, and the OAMP servers 344a-b can request and receive the new NAPTR data from the master name server 348 to thereby propagate the new NAPTR data to the sub-site OAMP servers 344a-b. In another embodiment, the OAMP servers 344a-b can notify the relevant out-of-region slave name servers 356a-b for the sub-site 210 of the availability of new NAPTR data for the South Central region. In one embodiment, the in-region slave name servers 356a-b can request and receive the new NAPTR data from the OAMP servers 344a-b to propagate the new NAPTR data to the in-region slave name servers 356a-b.

FIGS. 8-12 depict illustrative embodiments of data flow within the communication system of FIGS. 1-2 and 5-6. In one embodiment, the master LDAP server 340a can receive a request 804 from the subscriber server 130 to add a NAPTR record. For example, the request can take the form of an ADD command that includes an internet protocol address referenced to a telephone number that is provided in ".arpa" format. In another embodiment, the master LDAP server can determine analyze the NAPTR record that has been provided by the subscriber server 130 to determine where to store the NAPTR record for future call session processing. For example, the master LDAP server 340a can analyze 808 the URL or URI information in the NAPTR to determine whether the NAPTR is to ultimately be stored at an in-region slave name server or an out-of-region slave name server. In another embodiment, after the master LDAP server 340a determines the proper regional location to store NAPTR, then the master LDAP server 340*a* can write the NAPTR to a directory at an LDAP server 340*a* or 640*a* for the determined site. In one embodiment, where the master LDAP server 340*a* determines that the storage is to an in-region slave name server 352*a*, then the NAPTR is written 812 to a directory of an in-region (same region) LDAP server 340*a*. In one embodiment, where the master LDAP server 340*a* determines that the storage is to an out-of-region slave name server 652*a*, then the NAPTR is written 912 to a directory of an out-of-region (different region) LDAP server 640*a*.

In one embodiment, the LDAP servers 340*a-b* synchronize using multi-master replication 1004. In one embodiment, the master name server 348 for the North Central regional processing site 160 monitors 1008 the directory of the North Central region LDAP servers 340*a-b* for an indication that new NAPTR data has been received. For example, the master name server 348 can perform a directory search 1008 on any of the regional LDAP servers 340*a-b* to determine if a new NAPTR has been received, which could change the current NAPTR data configuration for the North Central region or zone. When the master name server 348 determines that new NAPRT data has been received, then master name server 348 can request 1010 the NAPTR data and receive 1012 the NAPTR data from one of the LDAP servers 340*a-b*. After receiving the NAPTR data, in one embodiment, the master name server 348 can request 1016 that the LDAP servers 340*a-b* delete the NAPTR data from a data queue and/or directory of the LDAP servers 340*a-b*. Following the deletion of the NAPTR data at the LDAP servers 340*a-b*, the LDAP servers 340*a-b* can be resynchronized 1018.

In one embodiment, where the master LDAP determines that the NAPTR data is for an out-of-region device, then the LDAP servers 340*a-b* synchronize using multi-master replication 1104. In one embodiment, the master name server 648 for the South Central regional processing site 160 monitors 1008 the directory of the South Central region LDAP server 640*a* for an indication that new NAPTR data has been received. For example, the master name server 648 can perform a directory search 1108 on the regional LDAP server 340*a* to determine if a new NAPTR has been received, which could change the current NAPTR data configuration for the South Central region or zone. When the master name server 648 determines that new NAPRT data has been received, then master name server 648 can request 1110 the NAPTR data and receive 1112 the NAPTR data from the LDAP server 640*a*. After receiving the NAPTR data, in one embodiment, the master name server 648 can request 1116 that the LDAP servers 640*a* delete the NAPTR data from a data queue and/or directory of the LDAP servers 640*a*. Following the deletion of the NAPTR data at the LDAP servers 640*a*, the LDAP servers 640*a* can be resynchronized 1118.

In another embodiment, the master name server 348 can notify 1204 an OAMP server 344*a* for the sub-site 210 of the availability of new NAPTR data. In one embodiment, the OAMP server 344*a* request and receive 1208 the new NAPTR data from the master name server 348 to propagate the new NAPTR data to the OAMP servers 344*a*. In another embodiment, the OAMP servers 344*a* can notify the in-region slave name servers 352*a-c* for the sub-site 210 to inform these slave name servers 352*a-c* of the availability of new NAPTR data. In one embodiment, the in-region slave name servers 352*a-c* request and receive the new NAPTR data from the OAMP server 344*a* to propagate the new NAPTR data to the in-region slave name servers 352*a-c*.

Figure 13:
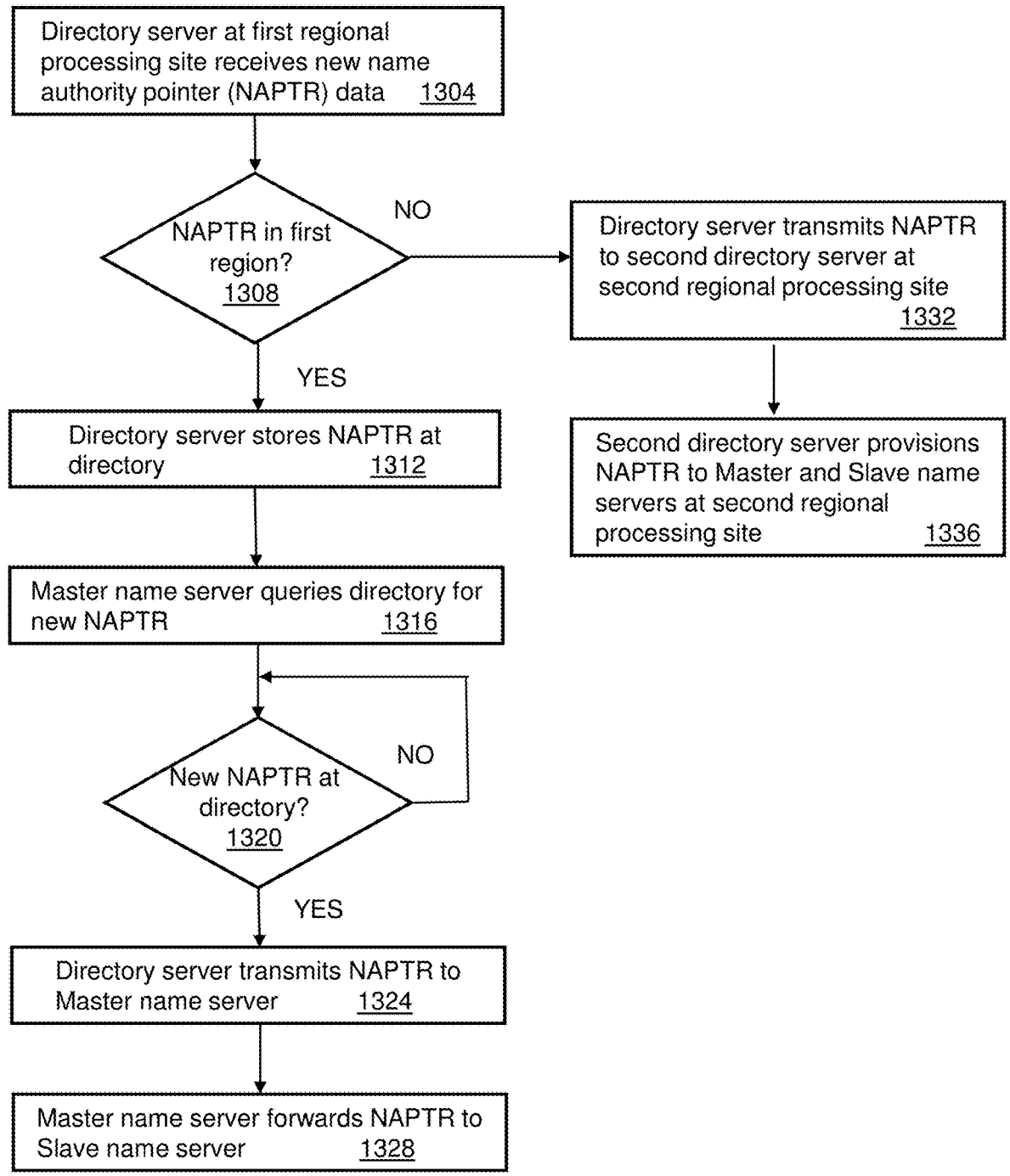
FIG. 13 depicts an illustrative embodiment of a method operating in portions of the system described in FIGS. 1, 2, 3A-3D, 5A-5D and 6A-6D.

FIG. 13 depicts an illustrative method 1300 that operates in portions of the devices of FIGS. 1-7, 14, and 15. Method 1300 can begin with step 1304 in which, a directory server 340*a* at a first regional processing site 160 receives new name authority pointer (NAPTR) data from a subscriber server 130.

In step 1308, the directory server 340*a* can determine if the new NAPTR data is within a first region of the first regional processing site 160. If the new NAPTR data is within the first region, then the directory server 340*a* can store the NAPTR data at a directory of the directory server 220 in step 1312.

In step 1316, a master name server 348 of the regional processing site can query the directory of the directory server 340*a*, in step 1316, to determine if a new NAPTR is at the directory of the directory server 340*a* at step 1320. If the NAPTR is at the directory, at step 1320, then the directory server 340*a* can transmit the NAPTR data to the master name server 348 at step 1324. In step 1328, the master name server 348 can forward the NAPTR data to a slave name server in step 1328.

If the NAPTR is not within the first region of the first regional processing site 160, then the directory server can transmit the NAPTR data to a second directory server 640*a* of a second regional processing site 170 in step 1332. The second directory server 640*a* of the second processing site 170 can provision the NAPTR to master name server 648 and/or slave name servers 562*a-b* in step 1336.

Upon reviewing the aforementioned embodiments, it would be evident to an artisan with ordinary skill in the art that said embodiments can be modified, reduced, or enhanced without departing from the scope and spirit of the claims described below. For example, in one embodiment, the OAMP servers 344*a-b* can process housekeeping routines for alarms and trap collection. In another embodiment, the OAMP servers 344*a-b* can interface with additional information technology systems. In another embodiment, the slave name servers 352*a-c* can notify other slave name servers of the availability of new NAPTR data and can transmit the NAPTR data to the other slave name servers.

In another embodiment, the updating of OAMP servers and the slave name servers can be performed by an incremental zone transfer (IXFR). In another embodiment, an IXFR can be used by the slave name servers to notify their master servers which version of a zone, or collection of NAPTR records, they currently hold. The slave name servers can further request transmission of only changes to the NAPTR records for their zone between their (old) version and the current (new) version. The size and duration of a zone transfer can thereby be reduced dramatically and result in significant time savings.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 14:
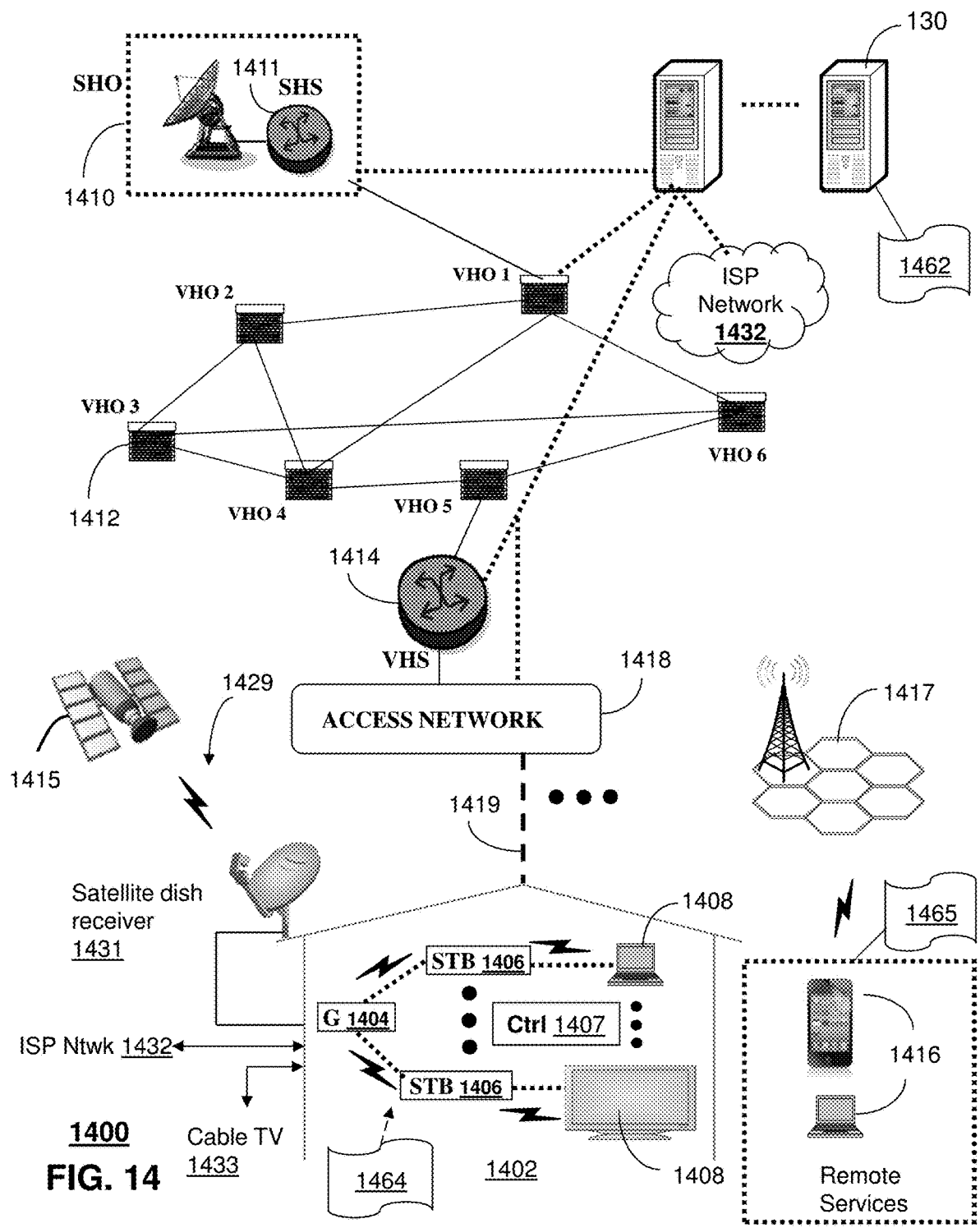
FIGS. 14-15 depict illustrative embodiments of communication systems that provide telephony communications.

FIG. 14 depicts an illustrative embodiment of a first communication system 1400 for delivering media content. The communication system 1400 can represent an Internet Protocol Television (IPTV) media system that can be used for delivering media content in the systems 1400 of FIG. 14.

The communication system 1400 can be utilized to provide media content to a wireless media processor device 1406 for presentation by a media presentation device 1408 by means of media server 130. In one embodiment, the system 1400 can be a subscription content service. The media content can be any type of viewable content, such as broadcast television, cable or premium television, video on demand, or pay-per-per view television. In one embodiment, the system 1400 can include one or more media servers 130 that can receive media content from one or more media content sources. The media servers 130 can deliver media content through the IPTV network 1400 to the wireless media processor device 1406. The wireless media processor device 1406 can provide the delivered media content to one or more media presentation devices 1408.

The IPTV media system 1400 can include a super headend office (SHO) 1410 with at least one super headend office server (SHS) 1411 which receives media content from satellite and/or terrestrial communication systems. In the present context, media content can represent, for example, audio content, moving image content such as 2D or 3D videos, video games, virtual reality content, still image content, and combinations thereof. The SHS server 1411 can forward packets associated with the media content to one or more video head-end servers (VHS) 1414 via a network of video head-end offices (VHO) 1412 according to a multicast communication protocol.

The VHS 1414 can distribute multimedia broadcast content via an access network 1416 to commercial and/or residential buildings 1402 housing a gateway 1404 (such as a residential or commercial gateway). The access network 1416 can represent a group of digital subscriber line access multiplexers (DSLAMs) located in a central office or a service area interface that provide broadband services over fiber optical links or copper twisted pairs 1419 to buildings 1402. The gateway 104 can use communication technology to distribute broadcast signals to media processors 106 such as Set-Top Boxes (STBs) which in turn present broadcast channels to media devices such as computers or television sets managed in some instances by a media controller 107 (such as an infrared or RF remote controller).

The gateway 104, the media processors 106, and media presentation devices 108 can utilize tethered communication technologies (such as coaxial, powerline or phone line wiring) or can operate over a wireless access protocol such as Wireless Fidelity (Wi-Fi), Bluetooth, Zigbee, or other present or next generation local or personal area wireless network technologies. By way of these interfaces, unicast communications can also be invoked between the media processors 106 and subsystems of the IPTV media system for services such as video-on-demand (VoD), browsing an electronic programming guide (EPG), or other infrastructure services.

A satellite broadcast television system 1429 can be used in the media system of FIG. 14. The satellite broadcast television system can be overlaid, operably coupled with, or replace the IPTV system as another representative embodiment of communication system 1400. In this embodiment, signals transmitted by a satellite 1415 that include media content can be received by a satellite dish receiver 1431 coupled to the building 1402. Modulated signals received by the satellite dish receiver 1431 can be transferred to the media processors 1406 for demodulating, decoding, encoding, and/or distributing broadcast channels to the media display devices 108. The media processors 1406 can be equipped with a broadband port to an Internet Service Provider (ISP) network 1432 to enable interactive services such as VoD and EPG as described above.

In yet another embodiment, an analog or digital cable broadcast distribution system such as cable TV system 1433 can be overlaid, operably coupled with, or replace the IPTV system and/or the satellite TV system as another representative embodiment of communication system 1400. In this embodiment, the cable TV system 1433 can also provide Internet, telephony, and interactive media services. The subject disclosure can apply to other present or next generation over-the-air and/or landline media content services system.

Some of the network elements of the IPTV media system can be coupled to one or more computing devices 130, a portion of which can operate as a web server for providing web portal services over the ISP network 1432 to wireline media devices 1406 or wireless communication devices 1416.

Communication system 1400 can also provide for all or a portion of the computing devices 130 to function as a media server 130. The media server 130 can use computing and communication technology to perform function 1462, which can include among other things, providing media content to one or more media processor devices 1406. The media processors 1406 and mobile communication devices 1416 can be provisioned with software functions 1464 and 1465, respectively, to utilize the services of media server 130.

Multiple forms of media services can be offered to media devices over landline technologies such as those described above. Additionally, media services can be offered to media devices by way of a wireless access base station 1417 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 15:
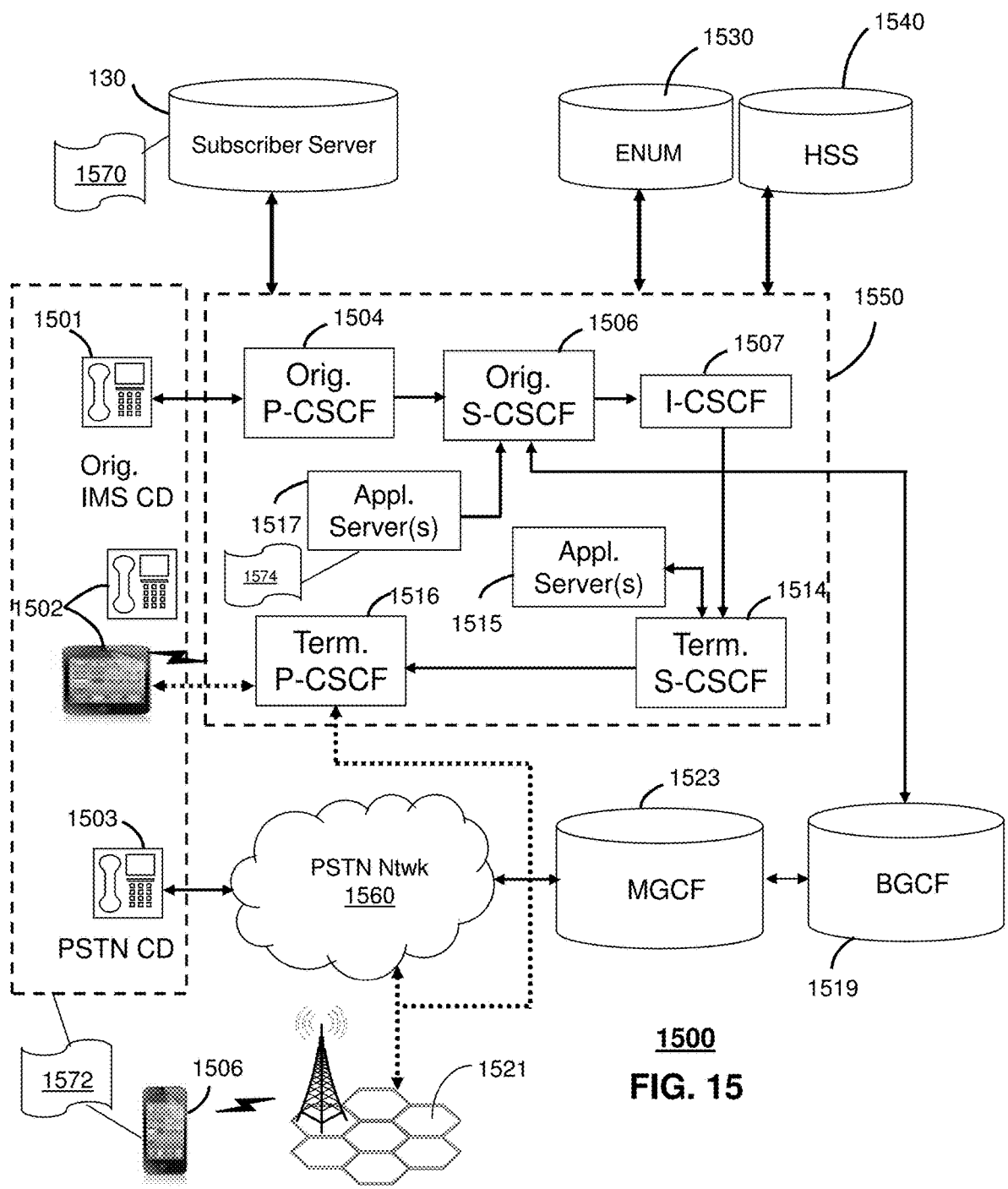

FIG. 15 depicts an illustrative embodiment of a communication system 1500 employing P Multimedia Subsystem (IMS) network architecture to facilitate the combined services of circuit-switched and packet-switched systems. Communication system 1500 can be overlaid or operably coupled with communication system 1400 as another representative embodiment of communication system 1400.

Communication system 1500 can comprise a Home Subscriber Server (HSS) 1540, a tElephone NUmber Mapping (ENUM) server 1530, and other network elements of an IMS network 1550. The IMS network 1550 can establish communications between IMS-compliant communication devices (CDs) 1501, 1502, Public Switched Telephone Network (PSTN) CDs 1503, 1505, and combinations thereof by way of a Media Gateway Control Function (MGCF) 1520 coupled to a PSTN network 1560. The MGCF 1520 need not be used when a communication session involves IMS CD to IMS CD communications. A communication session involving at least one PSTN CD may utilize the MGCF 1520.

IMS CDs 1501, 1502 can register with the IMS network 1550 by contacting a Proxy Call Session Control Function (P-CSCF) which communicates with an interrogating CSCF (I-CSCF), which in turn, communicates with a Serving CSCF (S-CSCF) to register the CDs with the HSS 1540. To initiate a communication session between CDs, an originating IMS CD 1501 can submit a Session Initiation Protocol (SIP INVITE) message to an originating P-CSCF 1504 which communicates with a corresponding originating S-CSCF 1506. The originating S-CSCF 1506 can submit the SIP INVITE message to one or more application servers (ASs) 1517 that can provide a variety of services to IMS subscribers.

For example, the application servers 1517 can be used to perform originating call feature treatment functions on the calling party number received by the originating S-CSCF 1506 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 1506 can submit queries to the ENUM system 1530 to translate an E.164 telephone number in the SIP INVITE message to a SIP Uniform Resource Identifier (URI) if the terminating communication device is IMS-compliant. The SIP URI can be used by an Interrogating CSCF (I-CSCF) 1507 to submit a query to the HSS 1540 to identify a terminating S-CSCF 1514 associated with a terminating IMS CD such as reference 1502. Once identified, the I-CSCF 1507 can submit the SIP INVITE message to the terminating S-CSCF 1514. The terminating S-CSCF 1514 can then identify a terminating P-CSCF 1516 associated with the terminating CD 1502. The P-CSCF 1516 may then signal the CD 1502 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In one embodiment, the communication system 1500 can be configured as a national telephony system that can be subdivided into a number of geographical regions. In one embodiment, an ENUM server 1530 can be configured as a series of regional ENUM servers. In one embodiment, a regional name server (RNS) 1535 can be configured as a series of regional name servers. In one embodiment, a call session can be initiated at the originating CD 1501 at a first geographic region. The originating S-CSCF 1506 at the first geographic region can inquire at a regional ENUM server 1530 for that first geographic region to seek to resolve a telephone number for a terminating CD 1502 to an IP address for the terminating CD 1502.

In one embodiment, the regional ENUM server 1530 can determine if a geographic area associated with the telephone number of the terminating CD 1502, such as a numbering plan area (NPA) code, is within the first geographic region of the RNS 1535. In one embodiment, the regional ENUM server 1530 can compare a NPA code from the telephone number to a list of regional NPA codes to determine if the telephone number is within the first geographic region. If the telephone number corresponds to a first geographic region call (i.e., is a call from an originating CD 1501 in the first geographic region to a terminating CD 1502 in the first geographic region), then the ENUM server 1530 can inquire to an in-region RNS 1535 for the NAPTR of the terminating device. If the NPA cod for the telephone number is found by the ENUM server 1530 to not be within the first geographic region, then the regional ENUM server 1530 can determine a second geographic region that correctly corresponds to the NPA code. In one embodiment, the ENUM server 1530 can send a request to an out-of-region RNS 1535 for NAPTR of the terminating device.

In one embodiment, the communication system 1500 can distribute NAPTR records for the national telephony system among many RNS servers 1535 at several regional processing sites. In one embodiment, a subscriber server 130 can provision NAPTR records among several in-region RNS 1535 at each regional site such that each in-region RNS 1535 only stores and only provides searching services for NAPTR records for telephone numbers corresponding to NPA area codes in the geographic region of the terminating device. In another embodiment, the subscriber server 130 can provision NAPTR records among an out-of-region RNS 1535 at each regional site, so that each regional site includes at least one out-of-region RNS 1535 to handle out-of-region calls. Each out-of-region RNS 1535 only stores and provides searching services for NAPTR records for telephone numbers corresponding to NPA area codes that are outside the geographic region of the calling device.

In some instances the aforementioned communication process is symmetrical. Accordingly, the terms "originating" and "terminating" in FIG. 15 may be interchangeable. It is further noted that communication system 1500 can be adapted to support video conferencing. In addition, communication system 1500 can be adapted to provide the IMS CDs 1501, 1502 with the multimedia and Internet services of communication system 1400 of FIG. 14.

If the terminating communication device is instead a PSTN CD such as CD 1503 or CD 1505 (in instances where the cellular phone only supports circuit-switched voice communications), the ENUM system 1530 can respond with an unsuccessful address resolution which can cause the originating S-CSCF 1506 to forward the call to the MGCF 1520 via a Breakout Gateway Control Function (BGCF) 1519. The MGCF 1520 can then initiate the call to the terminating PSTN CD over the PSTN network 1560 to enable the calling and called parties to engage in voice and/or data communications.

It is further appreciated that the CDs of FIG. 15 can operate as wire line or wireless devices. For example, the CDs of FIG. 15 can be communicatively coupled to a cellular base station 1521, a femtocell, a WiFi router, a Digital Enhanced Cordless Telecommunications (DECT) base unit, or another suitable wireless access unit to establish communications with the IMS network 1550 of FIG. 15. The cellular access base station 1521 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wire line and wireless communication technologies can be used by the CDs of FIG. 15.

Cellular phones supporting LTE can support packet-switched voice and packet-switched data communications and thus may operate as IMS-compliant mobile devices. In this embodiment, the cellular base station 1521 may communicate directly with the IMS network 1550 as shown by the arrow connecting the cellular base station 1521 and the P-CSCF 1516.

It is further understood that alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The subscriber server 130 of FIG. 1 can be operably coupled to the second communication system 1500 for purposes similar to those described above. It is further contemplated by the subject disclosure that the subscriber server 130 can perform function 162 and thereby provide NAPTRs for use in telephony communications involving the CDs 1501, 1502, 1503 and 1505 of FIG. 15. CDs 1501, 1502, 1503 and 1505, which can be adapted with software to perform function 1572 to utilize the services of the subscriber server 130. It is further contemplated that the subscriber server 130 can be an integral part of the application server(s) 1517 performing function 1574, which can be substantially similar to function 162 and adapted to the operations of the IMS network 1550.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 16:
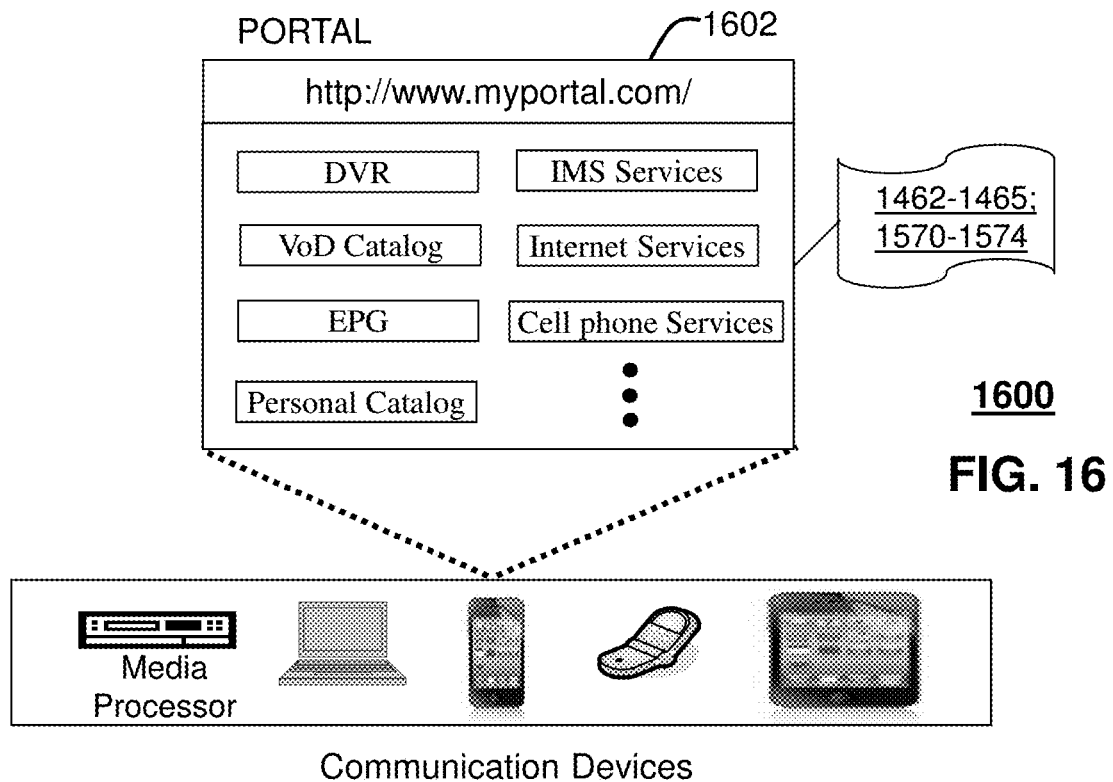
FIG. 16 depicts an illustrative embodiment of a web portal for interacting with the communication systems of FIGS. 1, 2, 3A-3D, 4A-4D, 5A-5D, 6A-6D, 7A-7D and 14-15.

FIG. 16 depicts an illustrative embodiment of a web portal 1602 which can be hosted by server applications operating from the computing devices 130 of the communication system 1400 illustrated in FIG. 14. The communication system 1400 can be utilized to provide media content to a wireless media processor device 1406 for presentation by a media presentation device 1408. The web portal system 1600 can be used to register and maintain subscriber location and contact information and to configure alerts.

The web portal 1602 can be used for managing services of communication systems 1400-1500. A web page of the web portal 1602 can be accessed by a Uniform Resource Locator (URL) with an Internet browser such as Microsoft's Internet Explorer™, Mozilla's Firefox™, Apple's Safari™, or Google's Chrome™ using an Internet-capable communication device such as those described in FIGS. 14-15. The web portal 1602 can be configured, for example, to access a media processor 1406 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 1406. The web portal 1602 can also be used for provisioning IMS services described earlier, provisioning Internet services, provisioning cellular phone services, and so on.

The web portal 1602 can further be utilized to manage and provision software applications 1462-1465, and 1570-1574 to adapt these applications as may be desired by subscribers and service providers of communication systems 1400-1500.

Figure 17:
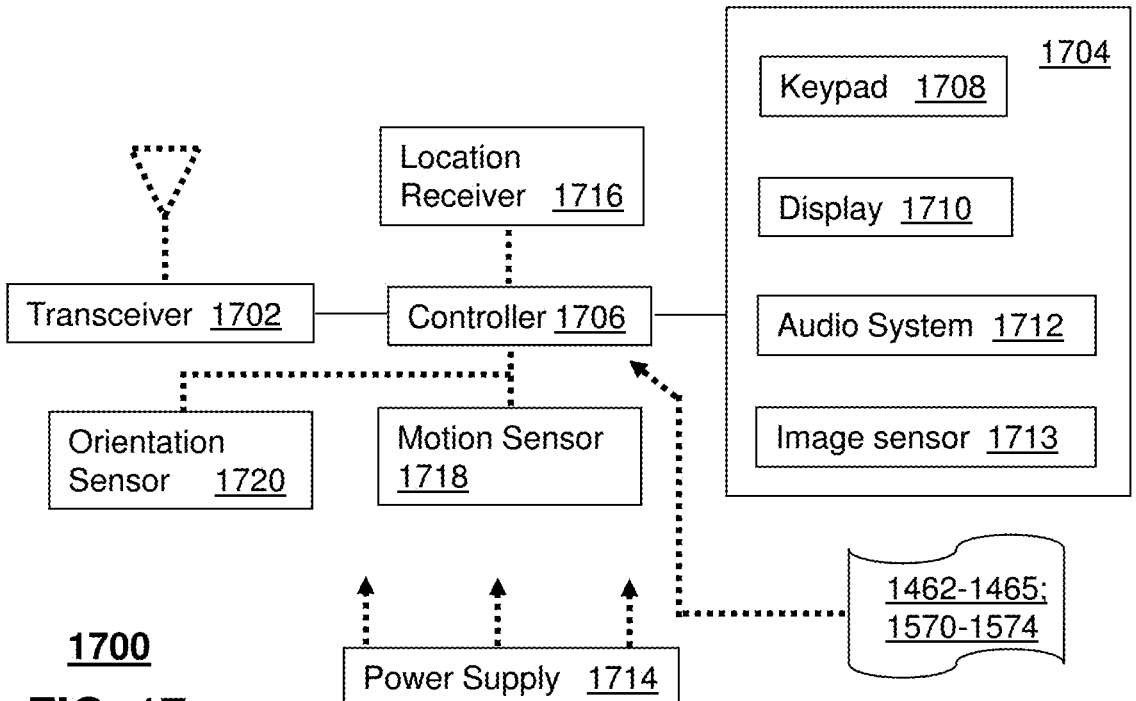
FIG. 17 depicts an illustrative embodiment of a communication device.

FIG. 17 depicts an illustrative embodiment of a communication device 1700. Communication device 1700 can serve in whole or in part as an illustrative embodiment of the devices depicted or otherwise described in FIGS. 1-13. The communication device 1700 can be utilized to receive emergency alert notifications, messages, and/or video streams for display at a wireless media processor device 1406; a media presentation device 1408, and/or a mobile communication device 1416.

The communication device 1700 can perform an operation associated with the presentation of the emergency alert information at a display according to the first action of the first viewer. The communication device 1700 can comprise a wireline and/or wireless transceiver 1702 (herein transceiver 1702), a user interface (UI) 1704, a power supply 1714, a location receiver 1716, a motion sensor 1716, an orientation sensor 1720, and a controller 1706 for managing operations thereof. The transceiver 1702 can support short-range or long-range wireless access technologies such as Bluetooth, ZigBee, Wi-Fi, DECT, or cellular communication technologies, just to mention a few. Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 1702 can also be adapted to support circuit-switched wireline access technologies (such as PSTN), packet-switched wireline access technologies (such as TCP/IP, VoIP, etc.), and combinations thereof.

The UI 1704 can include a depressible or touch-sensitive keypad 1706 with a navigation mechanism such as a roller ball, a joystick, a mouse, or a navigation disk for manipulating operations of the communication device 1700. The keypad 1706 can be an integral part of a housing assembly of the communication device 1700 or an independent device operably coupled thereto by a tethered wireline interface (such as a USB cable) or a wireless interface supporting for example Bluetooth. The keypad 1706 can represent a numeric keypad commonly used by phones, and/or a QWERTY keypad with alphanumeric keys. The UI 1704 can further include a display 1710 such as monochrome or color LCD (Liquid Crystal Display), OLED (Organic Light Emitting Diode) or other suitable display technology for conveying images to an end user of the communication device 1700. In an embodiment where the display 1710 is touch-sensitive, a portion or all of the keypad 1706 can be presented by way of the display 1710 with navigation features.

The display 1710 can use touch screen technology to also serve as a user interface for detecting user input. As a touch screen display, the communication device 1700 can be adapted to present a user interface with graphical user interface (GUI) elements that can be selected by a user with a touch of a finger. The touch screen display 1710 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 1710 can be an integral part of the housing assembly of the communication device 1700 or an independent device communicatively coupled thereto by a tethered wireline interface (such as a cable) or a wireless interface.

The UI 1704 can also include an audio system 1712 that utilizes audio technology for conveying low volume audio (such as audio heard in proximity of a human ear) and high volume audio (such as speakerphone for hands free operation). The audio system 1712 can further include a microphone for receiving audible signals of an end user. The audio system 1712 can also be used for voice recognition applications. The UI 1704 can further include an image sensor 1713 such as a charged coupled device (CCD) camera for capturing still or moving images.

The power supply 1714 can utilize common power management technologies such as replaceable and rechargeable batteries, supply regulation technologies, and/or charging system technologies for supplying energy to the components of the communication device 1700 to facilitate long-range or short-range portable applications. Alternatively, or in combination, the charging system can utilize external power sources such as DC power supplied over a physical interface such as a USB port or other suitable tethering technologies.

The location receiver 1716 can utilize location technology such as a global positioning system (GPS) receiver capable of assisted GPS for identifying a location of the communication device 1700 based on signals generated by a constellation of GPS satellites, which can be used for facilitating location services such as navigation. The motion sensor 1716 can utilize motion sensing technology such as an accelerometer, a gyroscope, or other suitable motion sensing technology to detect motion of the communication device 1700 in three-dimensional space. The orientation sensor 1720 can utilize orientation sensing technology such as a magnetometer to detect the orientation of the communication device 1700 (north, south, west, and east, as well as combined orientations in degrees, minutes, or other suitable orientation metrics).

The communication device 1700 can use the transceiver 1702 to also determine a proximity to a cellular, Wi-Fi, Bluetooth, or other wireless access points by sensing techniques such as utilizing a received signal strength indicator (RSSI) and/or signal time of arrival (TOA) or time of flight (TOF) measurements. The controller 1706 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 1700.

Other components not shown in FIG. 17 can be used in one or more embodiments of the subject disclosure. For instance, the communication device 1700 can include a reset button (not shown). The reset button can be used to reset the controller 1706 of the communication device 1700. In yet another embodiment, the communication device 1700 can also include a factory default setting button positioned, for example, below a small hole in a housing assembly of the communication device 1700 to force the communication device 1700 to re-establish factory settings. In this embodiment, a user can use a protruding object such as a pen or paper clip tip to reach into the hole and depress the default setting button. The communication device 1700 can also include a slot for adding or removing an identity module such as a Subscriber Identity Module (SIM) card. SIM cards can be used for identifying subscriber services, executing programs, storing subscriber data, and so forth.

The communication device 1700 as described herein can operate with more or less of the circuit components shown in FIG. 17. These variant embodiments can be used in one or more embodiments of the subject disclosure.

The communication device 1700 can be adapted to perform the functions of the wireless media processor device 1406, the media presentation device 1408, and/or the mobile communication devices 1416 of FIG. 14, as well as the IMS CDs 1501-1502 and PSTN CDs 1503-1505 of FIG. 15. It will be appreciated that the communication device 800 can also represent other devices that can operate in communication systems 1400-1500 of FIGS. 14-15 such as a gaming console and a media player.

The communication device 1700 shown in FIG. 17 or portions thereof can serve as a representation of one or more of the devices of communication systems 1400-1500. In addition, the controller 1706 can be adapted in various embodiments to perform the functions 1462-1465 and 1570-1574, respectively.

In one or more embodiments, the wireless set top box can request and obtain remote access to multiple home media processor subscriber accounts where the accounts may or may not be related. In this example, the wireless set top box can present media content or present other communication services (e.g., voice, video and/or data) associated with the multiple subscriber accounts at multiple display devices and/or at the same display device (e.g., multiple windows on a screen or picture-in-picture presentation. In one or more embodiments, the wireless set top box is a multi-mode communication device capable of engaging simultaneously in multiple communication sessions that utilize different wireless protocols.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 18:
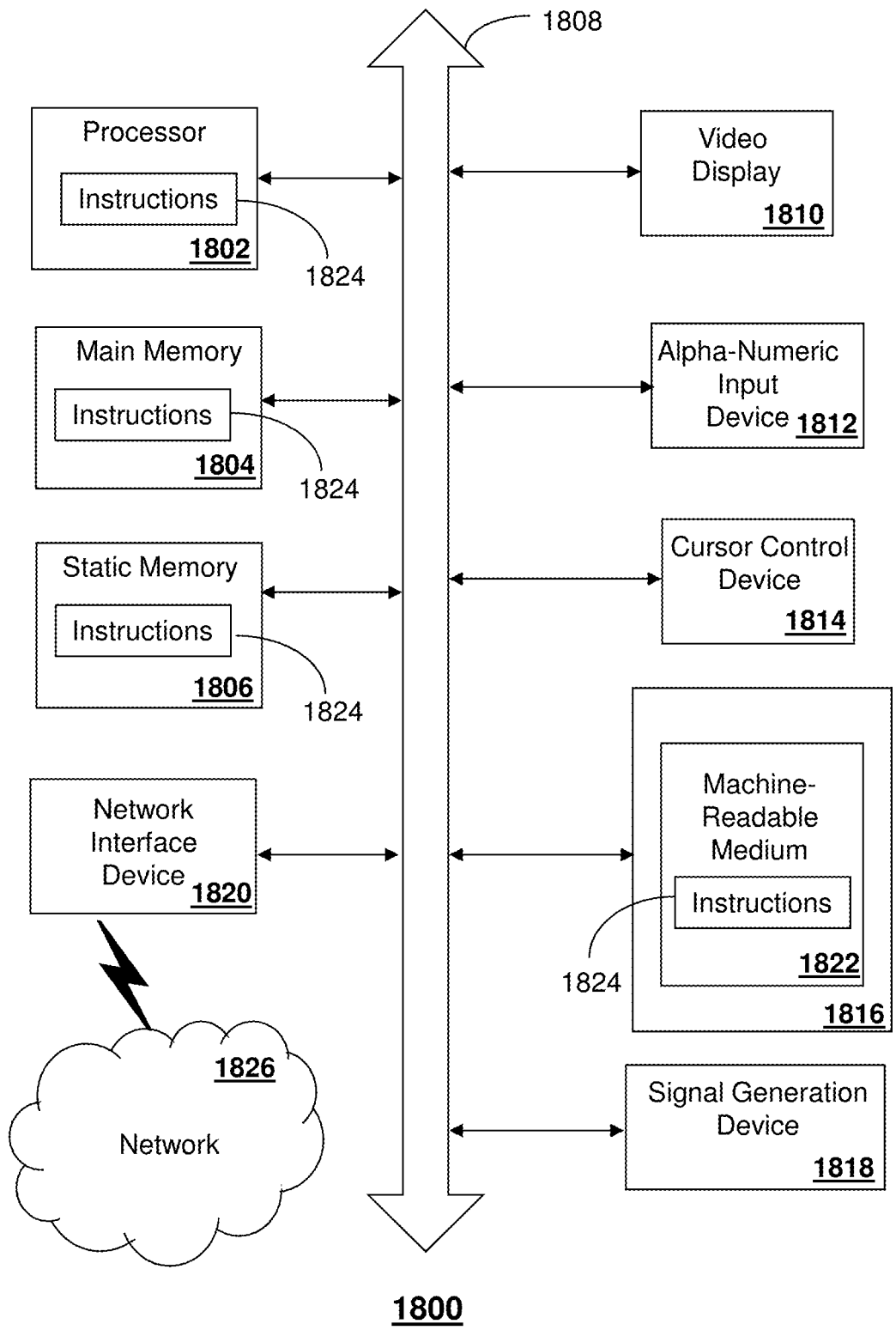
FIG. 18 is a diagrammatic representation of a machine in the form of a computer system within which a set of instructions, when executed, may cause the machine to perform any one or more of the methods described herein.

FIG. 18 depicts an exemplary diagrammatic representation of a machine in the form of a computer system 1800 within which a set of instructions, when executed, may cause the machine to perform any one or more of the methods describe above. For example, the wireless media processor device 1406, the media server device 1430, the media presentation device 1408, and/or the gateway device 1404, and/or the mobile communication device 1416 can comprise a machine in the form of a computer system 1800. In some embodiments, the machine may be connected (e.g., using a network 1826) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1800 may include a processor (or controller) 1802 (e.g., a central processing unit (CPU), a graphics processing unit (GPU, or both), a main memory 1804 and a static memory 1806, which communicate with each other via a bus 1806. The computer system 1800 may further include a display unit 1810 (e.g., a liquid crystal display (LCD), a flat panel, or a solid state display. The computer system 1800 may include an input device 1812 (e.g., a keyboard), a cursor control device 1814 (e.g., a mouse), a disk drive unit 1816, a signal generation device 1816 (e.g., a speaker or remote control) and a network interface device 1820. In distributed environments, the embodiments described in the subject disclosure can be adapted to utilize multiple display units 1810 controlled by two or more computer systems 1800. In this configuration, presentations described by the subject disclosure may in part be shown in a first of the display units 1810, while the remaining portion is presented in a second of the display units 1810.

The disk drive unit 1816 may include a tangible computer-readable storage medium 1822 on which is stored one or more sets of instructions (e.g., software 1824) embodying any one or more of the methods or functions described herein, including those methods illustrated above. The instructions 1824 may also reside, completely or at least partially, within the main memory 1804, the static memory 1806, and/or within the processor 1802 during execution thereof by the computer system 1800. The main memory 1804 and the processor 1802 also may constitute tangible computer-readable storage media.

Dedicated hardware implementations including, but not limited to, application specific integrated circuits, programmable logic arrays and other hardware devices that can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable array. Furthermore, software implementations (e.g., software programs, instructions, etc.) can include, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1822 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, Wi-Fi, Zigbee), and long-range communications (e.g., WiMAX, GSM, CDMA, LTE) can be used by computer system 1800.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure, including combinations of components and/or steps from the embodiments and/or methods described herein.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
  transmitting, by a first directory server of a first regional call processing system, a name authority pointer associated with a telephone number to a second directory server of a second regional call processing system, wherein the name authority pointer facilitates establishing communications with a communication device associated with the telephone number, wherein the transmitting is responsive to a first determination that the name authority pointer is not located within a first geographic region of the first regional call processing system, and wherein the second directory server is accessible by a first name server of the second regional call processing system for provisioning the name authority pointer to the first name server;
  determining, responsive to a directory search by a master name server, whether the name authority pointer had been newly received by the first directory server; and
  synchronizing, responsive to a second determination that the name authority pointer had been newly received by the first directory server, a replicate directory of a third directory server of the first regional call processing system.

2. The method of claim 1, wherein the second determination that the name authority pointer had been newly received by the first directory server is based upon the name authority pointer having changed a data configuration, and wherein the name authority pointer comprises an internet protocol address.

3. The method of claim 1, wherein the synchronizing comprises synchronizing the replicate directory of the third directory server to a first directory of the first directory server.

4. The method of claim 1, further comprising storing by the first directory server, responsive to a third determination that the name authority pointer is located within the first geographic region, the name authority pointer at a first directory of the first directory server.

5. The method of claim 4, further comprising:
  receiving, by the first directory server, a request to delete the name authority pointer from the first directory; and
  deleting, by the first directory server, the name authority pointer from the first directory responsive to the request.

6. The method of claim 1, wherein the name authority pointer is received by the first directory server from a subscriber server responsive to a change in the telephone number of the communication device.

7. The method of claim 1, wherein the first regional call processing system comprises a plurality of geographic regions and wherein the first regional call processing system comprises a plurality of processors operating in a distributed processing environment.

8. The method of claim 1, wherein the first determination that the name authority pointer is not located within the first geographic region is based on a numbering plan area code of the telephone number.

9. A system, comprising:
  a processor; and
  a memory that stores executable instructions that, when executed by the processor, perform operations, the operations comprising:
    transmitting a name authority pointer, by a first directory server of a first regional call processing system, to a second directory server of a second regional call processing system, wherein the name authority pointer is associated with a telephone number of a communication device, wherein the name authority pointer comprises an internet protocol address for establishing communications with the communication device, wherein the transmitting is responsive to a first determination that the name authority pointer is not located within a first geographic region of the first regional call processing system, and wherein the second directory server is accessible by a first name server of the second regional call processing system for provisioning the name authority pointer to the first name server;
    determining whether the name authority pointer had been newly received by the first directory server, wherein the determining whether the name authority pointer had been newly received by the first directory server is responsive to a directory search by a master name server; and
    synchronizing a replicate directory of a third directory server of the first regional call processing system, wherein the synchronizing is responsive to a second determination that the name authority pointer had been newly received by the first directory server.

10. The system of claim 9, wherein the second determination that the name authority pointer had been newly received by the first directory server is based upon the name authority pointer having changed a data configuration.

11. The system of claim 9, wherein the synchronizing comprises synchronizing the replicate directory of the third directory server to a first directory of the first directory server.

12. The system of claim 9, wherein the operations further comprise storing by the first directory server, responsive to a third determination that the name authority pointer is located within the first geographic region, the name authority pointer at a first directory of the first directory server.

13. The system of claim 12, wherein the operations further comprise:
  receiving, by the first directory server, a request to delete the name authority pointer from the first directory; and
  deleting, by the first directory server, the name authority pointer from the first directory responsive to the request.

14. The system of claim 9, wherein a subscriber status of the communication device changes, resulting in a changed subscriber status, wherein the name authority pointer is received by the first directory server from a subscriber server responsive to the changed subscriber status, and wherein the changed subscriber status occurs due to a change to the telephone number of the communication device.

15. The system of claim 9, wherein the first regional call processing system comprises a plurality of geographic regions and wherein the first regional call processing system comprises a plurality of processors operating in a distributed processing environment.

16. The system of claim 9, wherein the first determination that the name authority pointer is not located within the first geographic region is based on a numbering plan area code of the telephone number.

17. A non-transitory machine-readable storage medium comprising executable instructions that, when executed by a processing system including a processor, perform operations, the operations comprising:
   transmitting a name authority pointer that is associated with a telephone number to a first name server of a first regional call processing system for provisioning the name authority pointer to the first name server, wherein the transmitting is responsive to a first determination performed at a first directory server of the first regional call processing system that the name authority pointer is located within a first geographic region of the first regional call processing system;
   determining, responsive to a directory search by a master name server, whether the name authority pointer had been newly received by the first directory server, wherein the determining results in a second determination that the name authority pointer had been newly received by the first directory server, and wherein the second determination is based upon the name authority pointer having changed a data configuration; and
   synchronizing, responsive to the second determination that the name authority pointer had been newly received by the first directory server, a replicate directory of a second directory server of the first regional call processing system.

18. The non-transitory machine-readable storage medium of claim 17, wherein the operations further comprise storing, by the first directory server, the name authority pointer at a first directory of the first directory server.

19. The non-transitory machine-readable storage medium of claim 17, wherein the name authority pointer comprises an internet protocol address associated with a communication device.

20. The non-transitory machine-readable storage medium of claim 19, wherein the name authority pointer is received by the first directory server from a subscriber server responsive to a change in subscriber status of the communication device, and wherein the change in subscriber status comprises changing the telephone number of the communication device.

* * * * *